US009272606B2

(12) United States Patent
Schijve et al.

(10) Patent No.: US 9,272,606 B2
(45) Date of Patent: Mar. 1, 2016

(54) VEHICLE SIDE DOOR STRUCTURE AND METHOD OF MAKING AND USING THE SAME

(71) Applicant: SABIC Global Technologies B.V., Bergen op Zoom (NL)

(72) Inventors: Warden Schijve, Sittard (NL); Harold van Aken, Sittard (NL)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

(21) Appl. No.: 14/660,965

(22) Filed: Mar. 18, 2015

(65) Prior Publication Data

US 2015/0191076 A1 Jul. 9, 2015

Related U.S. Application Data

(63) Continuation of application No. 13/659,065, filed on Oct. 24, 2012, now Pat. No. 9,010,839.

(51) Int. Cl.

| | |
|---|---|
| ***B60J 5/04*** | (2006.01) |
| ***B29C 69/00*** | (2006.01) |
| ***B29C 45/14*** | (2006.01) |

(Continued)

(52) U.S. Cl.

CPC ............. *B60J 5/0455* (2013.01); *B29C 45/006* (2013.01); *B29C 45/14786* (2013.01); *B29C 69/00* (2013.01); *B60J 5/0427* (2013.01); *B60J 5/0429* (2013.01); *B60J 5/0481* (2013.01); *B29C 45/0005* (2013.01); *B29K 2105/105* (2013.01); *B29K 2105/12* (2013.01);

(Continued)

(58) Field of Classification Search

CPC ........ B60J 5/042; B60J 5/0422; B60J 5/0425; B60J 5/0429; B60J 5/0455; B60J 5/0481

USPC ............................... 296/146.5, 146.6; 49/502

See application file for complete search history.

(56) References Cited

U.S. PATENT DOCUMENTS

| | | | |
|---|---|---|---|
| 4,376,669 | A | 3/1983 | Math |
| 5,034,173 | A | 7/1991 | Altman et al. |

(Continued)

FOREIGN PATENT DOCUMENTS

| | | | |
|---|---|---|---|
| DE | 4407731 | A1 | 9/1995 |
| DE | 102006018286 | A1 | 10/2007 |

(Continued)

OTHER PUBLICATIONS

International Search Report; International Application No. PCT/IB2013/059322; International Filing Date: Oct. 11, 2013; Date of Mailing: Feb. 17, 2014; 5 Pages.

(Continued)

*Primary Examiner* — Jason S Morrow

(74) *Attorney, Agent, or Firm* — Cantor Colburn LLP

(57) ABSTRACT

In an embodiment, a side door for a vehicle, includes: a structure comprising a plastic shell comprising a shell support beam positioned across a main body portion of the shell, wherein the shell support beam comprises substantially unidirectional fiber strip sections; wherein the plastic shell comprise a plastic inner shell and a plastic outer shell; and wherein the side door has a score of at least 4 points in a side impact test conducted according to European New Car Assessment Protocol (Euro NCAP) Side Impact Testing Protocol Version 5.2 (November 2011).

16 Claims, 13 Drawing Sheets

(51) Int. Cl.
*B29L 31/30* (2006.01)
*B29C 45/00* (2006.01)
*B29K 105/12* (2006.01)
*B29K 105/10* (2006.01)

(52) U.S. Cl.
CPC . *B29L 2031/3014* (2013.01); *B29L 2031/3055* (2013.01); *Y10T 29/4998* (2015.01)

(56) References Cited

U.S. PATENT DOCUMENTS

| | | | |
|---|---|---|---|
| 5,857,732 | A | 1/1999 | Ritchie |
| 5,876,829 | A | 3/1999 | Dupont et al. |
| 6,719,355 | B2 | 4/2004 | Ornig et al. |
| 6,779,830 | B2 | 8/2004 | Patberg et al. |
| 6,821,613 | B1 | 11/2004 | Kagi et al. |
| 6,854,791 | B1 | 2/2005 | Jaggi |
| 7,048,324 | B2 | 5/2006 | Armbruster et al. |
| 7,077,438 | B2 | 7/2006 | Albers et al. |
| 7,442,435 | B2 | 10/2008 | Lee et al. |
| 7,470,388 | B2 | 12/2008 | Husler et al. |
| 2001/0028128 | A1 | 10/2001 | Blanchon |
| 2003/0097796 | A1 | 5/2003 | Schutt et al. |
| 2003/0189357 | A1 | 10/2003 | Patberg et al. |
| 2004/0216386 | A1 | 11/2004 | Chernoff et al. |
| 2005/0153120 | A1 | 7/2005 | Birrell |
| 2005/0236093 | A1 | 10/2005 | Taggart |
| 2006/0165955 | A1 | 7/2006 | Ruegg et al. |
| 2008/0038569 | A1 | 2/2008 | Evans et al. |
| 2008/0238136 | A1 | 10/2008 | Fuetterer |
| 2008/0313966 | A1 | 12/2008 | Sielhorst |
| 2008/0315618 | A1 | 12/2008 | Salzmann et al. |
| 2009/0165392 | A1 | 7/2009 | Totani et al. |
| 2011/0186212 | A1 | 8/2011 | Kawamura |
| 2012/0280533 | A1 | 11/2012 | Gachter et al. |

FOREIGN PATENT DOCUMENTS

| | | | |
|---|---|---|---|
| DE | 102007037680 | A1 | 2/2009 |
| EP | 1916440 | A2 | 4/2008 |
| EP | 2371515 | A1 | 10/2011 |
| FR | 2908067 | A1 | 5/2008 |
| GB | 2471265 | A | 12/2010 |
| JP | 2006044261 | A | 2/2006 |
| JP | 2006316512 | A | 11/2006 |
| WO | 8103467 | A1 | 12/1981 |
| WO | 9006226 | A1 | 6/1990 |
| WO | 2004000525 | A1 | 12/2003 |
| WO | 2009019102 | A1 | 2/2009 |
| WO | 2010071214 | A1 | 6/2010 |
| WO | 2010101874 | A1 | 9/2010 |
| WO | 2011032533 | A1 | 3/2011 |
| WO | 2011063538 | A1 | 6/2011 |
| WO | 2011085792 | A1 | 7/2011 |
| WO | 2011095399 | A1 | 8/2011 |
| WO | 2011120650 | A1 | 10/2011 |
| WO | 2011128048 | A1 | 10/2011 |

OTHER PUBLICATIONS

Kaufmann et al.; "Lightweight Parts wtih a Thermoplastic Matrix"; Kunststoffe International; Document No. PE110709; Mar. 2011; pp. 106-109.

Machine Translation of German Patent No. 4407731; Date of Publication Sep. 14, 1995; 9 pages.

Quitter; "Vehicle Door in Thermoplastic and Bio-Compositen"; English Translation; http://konstruktionspraxis.vogel.de/themen/werkstoffe/verbundwerkstoffe/articles/372476/; Jul. 30, 2012; 7 Pages.

Sheshadri, Ashwin; "Design and Analysis of a Composite Beam for Side-Impact Protection of Occupants in a Seda"; Thesis Statement, Bachelor of Engineering, VTU, India; 2002; 141 Pages.

Sommer, Norbert; "Challenges and Solutins with the Use of Composite Materials in Modular Doors"; Doors and Closures in Car Body Engineering; Nov. 16-17, 2011; 27 Pages.

Written Opinion of the International Searching Authority; International Application No. PCT/IB2013/059322; International Filing Date: Oct. 11, 2013; Date of Mailing: Feb. 17, 2014; 6 Pages.

VEHICLE SIDE DOOR STRUCTURE AND METHOD OF MAKING AND USING THE SAME

CROSS REFERENCE TO RELATED APPLICATION

This application is a continuation of U.S. application Ser. No. 13/659,065, now issued as U.S. Pat. No. 9,010,839, which filed Oct. 24, 2012, the contents of which are hereby incorporated by reference in its entirety.

BACKGROUND

The present disclosure relates to a vehicle side door structure capable of meeting automobile safety standards for crash loads and mechanical requirements, and to methods of making and using the same.

Automotive manufacturers are continuously working to reduce the weight of passenger cars in order to meet ever-changing government regulations regarding fuel efficiency and emissions reduction. An automobile's largest structure is the structural body, commonly known as the body-in-white (BIW). BIW refers to the welded sheet metal components which form the structure of the automobile and to which other components are joined, e.g. the doors, the engine, the chassis, the exterior and interior trim, the seats, etc. Since it is the largest structure in the automobile, the BIW has become a target for weight reduction by manufacturers. However, much less consideration has been given to achieving weight reduction in structural components of the automobile, such as the doors.

In order to meet safety standards for side crash impact or pole side impact testing, metal crash beams made of high strength steel are incorporated in automobile side doors. The high strength and durability of the steel crash beams plays a significant role in determining the durability and crash worthiness of the side door.

It is desirable to reduce the weight of a vehicle without compromising the structural integrity and durability, and therefore the safety, of the overall vehicle. There is therefore a need for automobile structural parts, such as side doors, having a reduced weight, and a reduced manufacturing cost, while retaining the necessary mechanical properties required to meet automobile side impact safety standards.

BRIEF DESCRIPTION

Disclosed in various embodiments are side doors for automobiles comprising a two-shell composite structure as well as methods for making the side doors.

In some embodiments, a side door for a vehicle can comprise: a structure comprising a plastic shell comprising a fiber strip across a width of the plastic shell. The plastic shell support beam can comprise a fiber strip.

In some embodiments, a side door for a vehicle, includes: a structure comprising a plastic shell comprising a shell support beam positioned across a main body portion of the shell, wherein the shell support beam comprises substantially unidirectional fiber strip sections; and wherein the side door has a score of at least 4 points in a side impact test conducted according to European New Car Assessment Protocol (Euro NCAP) Side Impact Testing Protocol Version 5.2 (November 2011).

These and other non-limiting characteristics are more particularly described below.

BRIEF DESCRIPTION OF THE DRAWINGS

Referring now to the figures, which are exemplary embodiments, and wherein the like elements are numbered alike.

DETAILED DESCRIPTION

Figure 1:
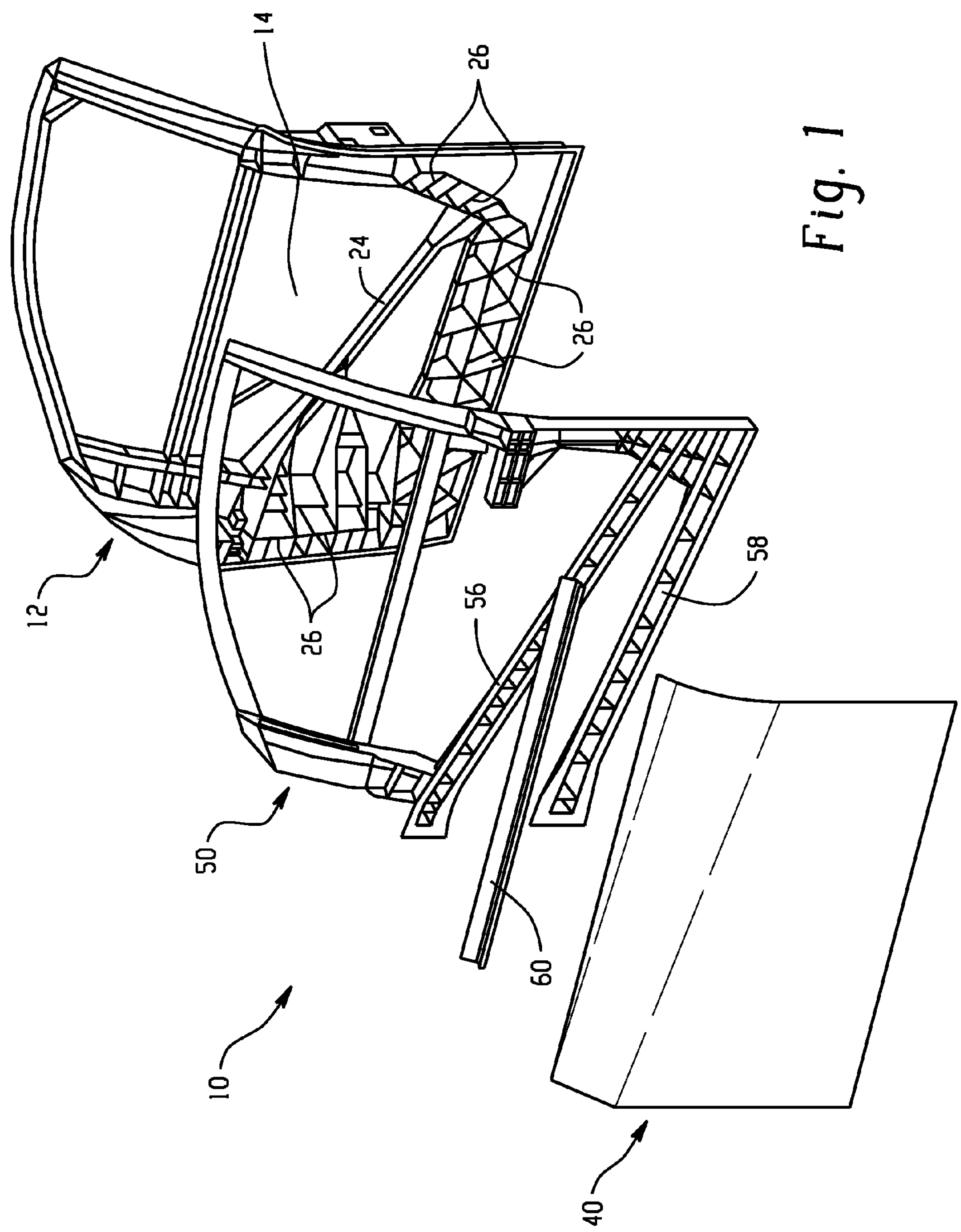
FIG. 1 is an expanded view of an assembly for a side door of an automobile that includes an exemplary two-shell composite.

As mentioned above, it is desirable to reduce the overall weight of an automobile without compromising the structural integrity, durability, and therefore the safety, of the vehicle. There is therefore a need for automobile structural parts, such as side doors, having a reduced weight, and a reduced manufacturing cost, and which retain the necessary mechanical properties required to meet automobile side impact safety standards.

The incorporation of plastic components within the interior of the automobile is possible where structural integrity is not an issue. The replacement of metal materials, such as steel, with plastic materials, while effective at reducing the weight of the component, can result in reduced stiffness of the material, which in turn, can have a direct impact on the mechanical properties, durability, and crash worthiness of the component.

Disclosed herein, in various embodiments, is a side door for an automobile comprising a composite structure (e.g., a two-shell composite structure). The composite structure includes a plastic inner shell and a plastic outer shell comprising a substantially unidirectional fiber strip. As used herein, substantially unidirectional refers to a strip wherein greater than or equal to 50 wt. % of the fibers (i.e., based upon the total weight of the fibers in the strip) are oriented in a direction with an angle of +45° to −45° of a main axis of the strip, wherein a main or major axis is the longest axis. Essentially, the placement of the substantially unidirectional fiber strip at strategic (e.g. localized positions in the plastic inner shell and/or the plastic outer shell) can be used to provide structural integrity to the two-shell composite structure, and accordingly, to the side door structure as well. Even without the use of metal support beams, the desired structural integrity can be attained. Generally, the support beam can extend across the shell, from the front to the rear and be oriented so as to, during an impact, transfer a portion of the impact load to the BIW. For example, with inner and outer plastic side door shells, substantially unidirectional fiber strip(s) can be oriented through the door, extending from near the front window opening, across the shell, to the rear of the door. Optionally, the substantially unidirectional fiber strip(s) can extend from near the window in the front of the shell, diagonally downward across the shell to a rear of the shell. With the substantially unidirectional fiber strip(s) across the shell as described, the desired European New Car Assessment Protocol (EuroNCAP) side impact test (conducted according to Euro NCAP Side Impact Testing Protocol Version 5.2 (November 2011)) can be passed with scores higher than 4 points for this test. Desirably, substantially unidirectional fiber strip(s) are also located around the window frame to provide structural integrity to the window frame.

These composite door structures with the substantially unidirectional fiber strips can be free of metal support structures. In other words, the only metal components in the side door can be gears for opening and closing the window, the door handle, the hinge attaching the door to the BIW, or any non-structural metal components.

Although it had been believed that necessary structural integrity to meet side impact standards as well as other Euro NCAP standards required full or at least partly metal doors, e.g., steel, a non-metal solution has been discovered. It has been surprisingly discovered that the test standards can be met while the weight of the automobile side door can be reduced by replacing standard metal support components in the door with the plastic composite structure. The stiffness of the composite structure is comparable to that of a steel door thereby minimizing any effects on the structural integrity and durability of the door as compared to a steel door. The automobile side doors described herein are therefore capable of meeting automobile safety standards for crash loads and mechanical requirements. Further, the lower cost associated with the new integrated plastic design directly impacts the overall manufacturing cost for each of the side doors as well as for the automobile as a whole.

In some embodiments, the side door for an automobile comprises a composite structure comprising a plastic inner shell and a plastic outer shell. The plastic inner shell and the plastic outer shell of the two-shell composite comprise a fiber reinforced polymer material and a substantially unidirectional fiber strip. The fiber reinforced polymer material is located throughout the structure of the plastic inner shell and the plastic outer shell, while the substantially unidirectional fiber strip is positioned in strategic locations within the inner shell and the outer shell. Examples of elements within the plastic inner shell that can be reinforced with the substantially unidirectional fiber strip include the inner shell support beam, the window frames, and all (or optionally portions) of the inner shell main body portion, as well as combinations comprising at least one of these locations. Examples of elements within the plastic outer shell that can be reinforced with the substantially unidirectional fiber strip include the outer shell support beams, the window frames, and all (or optionally portions) of the outer shell main body portion, as well as combinations comprising at least one of these locations. Optionally, the inner shell and the outer shell are free of metal support elements. Optionally, the accessories (e.g., door handle, lock (or portion of the lock configured to receive the key)), wiring, window mechanism, guide rail parts, and/or speakers can comprise metal.

The plastic inner shell can comprise an inner shell support beam. Alternatively, or in addition, the outer plastic shell can comprise at least two non-intersecting outer shell support beams. The inner shell support beam and the outer shell support beams can each comprise the substantially unidirectional fiber strip, e.g., substantially unidirectional fiber strip overmolded with fiber-reinforced polymer material.

The fiber reinforced polymer material can comprise various polymer materials, such as, for example, e.g., thermoplastic polymers, thermoset polymers and combinations thereof. Possible polymer materials can include thermoplastic polymers as well as combinations of thermoplastic polymers with elastomeric polymers, and/or thermoset polymers. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); and thermoplastic olefins (TPO); and combinations comprising at least one of the foregoing materials. For example, the plastic component can comprise Xenoy* resin, which is commercially available from SABIC Innovative Plastics IP B.V. It is further contemplated that materials such as foam (e.g., expanded polypropylene (EPP)) can be added to the structure, e.g., to provide occupant protection and/or further door structural integrity.

In addition to the polymer, the fiber-reinforced polymer material also includes reinforcing fiber. Some possible reinforcing fiber materials that can be used in any of the above described polymer materials include fibers such as glass (including modified glass), carbon (including modified carbon), natural (including modified natural), aramid, basalt, polymeric, and so forth, as well as combinations comprising at least one of the foregoing types of fibers, and specifically, glass, carbon, aramid, and/or basalt. In some embodiments, the reinforcing fiber is a glass fiber, such as E-glass, S-glass, AR-glass, T-glass, D-glass, R-glass, and combinations comprising at least one of the foregoing.

Generally, the fibers used for this application are long fibers, e.g., fibers having an aspect ratio (length/diameter) of greater than or equal to 10, specifically, greater than or equal to 50, more specifically, 50 to 500, and yet more specifically, 80 to 400. For example, the diameter of the long fiber may range from 5 to 35 micrometers (μm), specifically, 10 to 20 μm. The fibers can have a length, for example, of greater than or equal to 0.4 millimeter (mm), specifically, greater than or equal to 1 mm, more specifically, a length of greater than or equal to 2 mm.

An exemplary fiber-reinforced polymer material is STAMAX* resin, which is a long glass fiber filled polypropylene resin also commercially available from SABIC Innovative Plastics IP B.V. The plastic component can also be made from combinations comprising at least one of any of the above-described polymer materials and/or reinforcements, e.g., a combination with a thermoset material.

Optionally, the fibers can be coated with a sizing agent. In other embodiments, the glass fibers are not coated with a sizing agent. The amount of sizing agent employed is generally the amount that is sufficient to bind the filaments into a continuous strand. When the fibers are coated with a sizing agent, it is generally beneficial to have an amount of sizing agent of about 0.1 to about 5 weight percent (wt. %), based on the combined weight of the fibers and the sizing.

The amount of polymer in the fiber-reinforced polymer material is dependent upon the amount and/or type of reinforcing fiber used and/or the amount and presence of other components in the fiber-reinforced polymer material. For example, the polymer can be present in amounts of 40 to 80 wt. %, specifically, 50 to 75 wt. %, and more specifically, 60 to 70 wt. %, based upon a total weight of the fiber-reinforced polymer material, e.g., for a glass fiber reinforced polypropylene.

The amount of reinforcing fiber used in the fiber-reinforced polymer material is dependent on one more factors including, but not limited to, the polymer used and/or the presence of any other additives or fillers. For example, the amount of reinforcing fiber can be 20 to 60 wt. %, specifically, 25 to 50 wt. %, and more specifically, 30 to 45 wt. %, based upon a total weight of the fiber-reinforced polymer material, e.g., for a glass fiber reinforced polypropylene.

As stated above, the substantially unidirectional fiber strip has a majority of the fibers are oriented at an angle of +45° to −45° of a main axis. Desirably, greater than or equal to 60 wt. %, specifically, greater than or equal to 70 wt. %, and more specifically, greater than or equal to 80 wt. % and yet more specifically, greater than or equal to 90 wt. % of the fibers (based upon a total weight of the fibers in the strip), are oriented at the angle of +45° to −45° of a main axis. For example, close to half (e.g. 40 wt. % to 60 wt. %, specifically 45 wt. % to 55 wt. %, more specifically about 50 wt. %) of the fibers can be oriented at an angle with respect to the main axis in an (+) alfa direction, while the other half (e.g. 40 wt. % to 60 wt. %, specifically 45 wt. % to 55 wt. %, more specifically about 50 wt. %) of the fibers can be oriented in the (−) alfa direction, wherein alfa is an angle between 1° and 45° with respect to the main axis (e.g., along the major axis).

The fibers can be continuous in length through the strip or discontinuous long fibers. Long fibers are fibers that have the same or nearly the same effect as continuous fibers in structural integrity. Specifically, long fibers have a length of greater than or equal to 10 millimeters (mm) The fiber strip material can comprise woven fabrics, stitched multi-axial fabrics, and other materials that have a majority of the fibers oriented in the main strip direction (i.e., oriented at angle of +45° to −45° to the major (e.g., main) axis). The fiber strip material can impart the structural integrity to meet a side impact test conducted according to Euro NCAP Side Impact Testing Protocol Version 5.2 (November 2011). A side door disclosed herein (with the fiber strip) that meets Euro NCAP Side Impact Testing Protocol Version 5.2 (November 2011), can do with a weight that is less than a minimum weight of a steel side door for the same size vehicle that also meets the Euro NCAP Side Impact Testing Protocol Version 5.2 (November 2011).

The fiber strip material is formed from the fibers (continuous fibers and/or long fibers) embedded in a polymer matrix. Possible fiber materials include those discussed above with respect to the reinforcing fibers, while the polymer matrix can comprise any of the materials discussed above regarding the polymer material for the fiber reinforced polymer material. Fiber volume percentages in the substantially unidirectional fiber strip can be 10 to 85%, specifically 30 to 70%, more specifically, the fiber volume percentage is as high as possible, typically being between 50% to 60%, based on the total volume of the substantially unidirectional fiber strip.

The substantially unidirectional fiber strip can be prepared, for example, by pultruding rovings of continuous fibers through a molten polymer, thereby impregnating the fiber rovings with the polymer. The result is a continuous fiber composite in which the fibers are aligned with one another. The composite is then formed into a sheet. Other production methods to produce this material can also be used, such as extrusion of continuous and/or long fibers.

The substantially unidirectional fiber strip can be provided in various forms, such as a monolithic block. Alternatively, the substantially unidirectional fiber strip can be in the form of layers of tape, wherein the strip is formed by layering tape such that the majority of fibers in each of the layers are positioned to run in a direction of +45° to −45° of a main axis. Accordingly, the formed substantially unidirectional strip material has a high degree of strength and stiffness along a parallel direction with respect to the major axis of the strip. The substantially unidirectional fiber strip can be supplied in the form of sheets which can be cut to the desired size and/or shape for molding. The thickness of the strip is based upon the particular side door, the space available, and the needed structural integrity. Generally, the thickness is less than or equal to 10 mm, specifically, 0.5 to 8 mm, and more specifically, 1 to 5 mm.

In essence, the two-shell composite structure is a plastic structure with localized areas reinforced with substantially unidirectional fiber strips. Inclusion of the two-shell composite in the side door structure provides the side door with the structural integrity and durability needed to meet side impact safety standards imposed by the automobile industry, such as Euro NCAP. The European New Car Assessment Protocol (Euro NCAP) is a European standard developed to provide rating schemes for crash testing of automobiles. One area of interest relates to side impact and pole impact assessments along the side of the vehicle.

The side door comprising a two-shell composite structure described herein attains a score of at least 4 points, specifically, at least 6 points, and more specifically 8 points (the maximum score), in a side impact test conducted according to Euro NCAP Side Impact Testing Protocol Version 5.2 (November 2011), and Euro NCAP Assessment Protocol—Adult Occupant Protection Version 5.4 (November 2011).

Additionally, or alternatively, the side door has a score of at least 4 points, specifically, at least 6 points, and more specifically 8 points (the maximum score), in a pole impact test conducted according to Euro NCAP Pole Impact Testing Protocol Version 5.2 (November 2011), and Euro NCAP Assessment Protocol—Adult Occupant Protection Version 5.4 (November 2011).

A more complete understanding of the components, processes, and structures disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates an assembly of major components of an exemplary automobile side door 10. As shown in FIG. 1, side door 10 comprises a plastic inner shell 12, a plastic outer shell 50, optional crash tube(s) 60, and a door skin 40. As used herein, and as illustrated in FIG. 1, the term "inner" when used in reference to the plastic inner shell, relates to the innermost portion of the two shell composite structure from a perspective viewed from the interior of the car. Similarly, the term "outer" when used in reference to the plastic outer shell, relates to the outermost portion of the two shell composite structure from a perspective viewed from the interior of the car.

Turning now to FIG. 1, a depiction of an embodiment of an assembly for a side door of an automobile comprising a two-shell composite is illustrated. As shown in FIG. 1, the plastic inner shell 12 has a main body portion 14 and a support beam 24 positioned across a main body portion 14 of the inner shell 12. The plastic inner shell 12 also includes ribbing 26 positioned on three main sides. The ribbing 26 is positioned adjacent the periphery of the inner shell 12, e.g., extending from (and optionally along) the rear of the main body portion 16, across the bottom of the main body portion 20, and up the front of the main body portion 18 to the window frame. The ribbing 26 can provide load transfer from the outer skin 40 towards the car body, and can add stiffness that can reduce intrusion during a crash. During a side impact crash, the ribbing 26 acts to transfer the crash load to the body-in-white (not shown), thereby preventing the outer skin bottom edge (or side edges) from being displaced into the car interior during a side crash. The ribbing 26 can have various shapes and sizes, being designed to provide the desired structural integrity. Generally, from the rear 16 across the bottom 20 (e.g., across greater than or equal to 50% of the bottom, specifically greater than or equal to 75% of the bottom), the ribbing can be located in the bottom 50%, specifically, in the bottom 25% of the inner shell 12. Along the front 18, the ribbing can extend up the front 18 from the bottom 20 to the lower window frame portion 36. The inclusion of ribbing is not possible in pressed metal parts.

Extending across the inner shell 12, between the lower ribbing (near the juncture of the rear 16 and bottom 20) and the upper ribbing (near the juncture of the front 18 and lower window frame portion 36) can be a support beam 24.

The plastic outer shell 50 in FIG. 1 includes an outer shell upper support beam 56 and an outer shell lower support beam 58. The outer shell support beams 56 and 58, as illustrated, can be non-parallel, non-intersecting, and extend across the width of the outer shell 50 from the front to the rear. While FIG. 1 shows the outer shell upper support beam 56 and the outer shell lower support beam 58 in a non-parallel configuration, the beams can also be positioned parallel to one another.

The door skin 40 (e.g., the outer covering of the door that is visible once assembled) is located adjacent to the outer shell 50 of the two-shell composite, and is attached to the outer shell at the time of assembly of the individual side door components. Methods of attaching the outer shell to the door skin can be achieved using various methods including bonding, mechanically fastening, welding, deforming of one of the components (e.g., bending an edge of the component to form an overlap area that can be used as an attachment section), or a combination comprising at least one of the foregoing methods.

Figure 2:
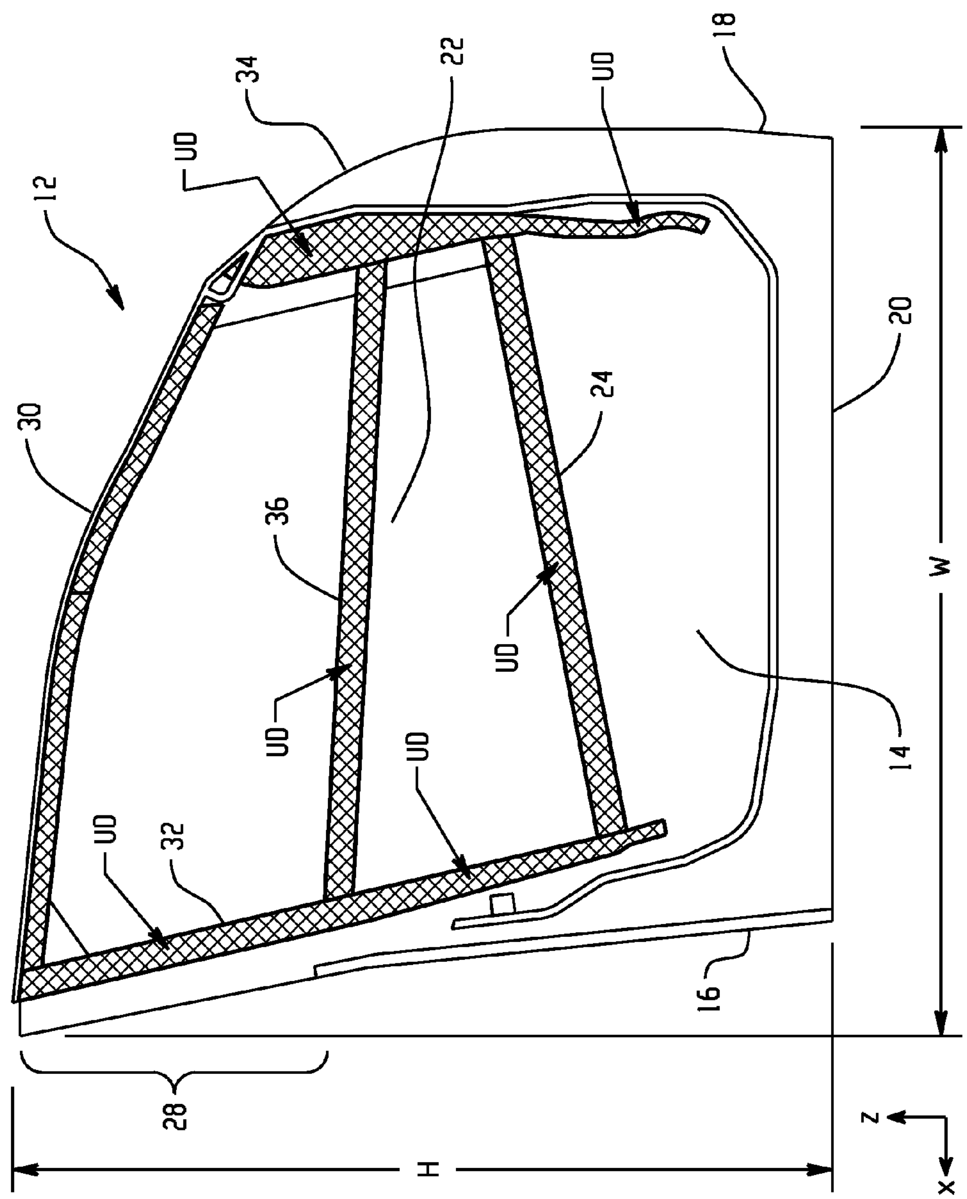
FIG. 2 is an illustration of an embodiment of the inner shell of the two-shell composite including exemplary locations for the substantially unidirectional fiber strip.

FIG. 2 is an illustration of an embodiment of the plastic inner shell 12 of the two shell composite structure, the inner shell having a width W and a height H as shown. The plastic inner shell 12 includes an inner shell main body portion 14 and an inner shell window frame portion 28. The inner shell window frame portion 28 and the inner shell main body portion 14 of the plastic inner shell can each comprise a fiber-reinforced polymer material and a substantially unidirectional fiber strip.

FIG. 2 shows the position of the substantially unidirectional fiber strip "UD" in the plastic inner shell 12. As shown in FIG. 2, the substantially unidirectional fiber strip UD can be positioned round the inner shell window frame portion 28, e.g., along the bottom window frame portion 36, the upper window frame portion 30, the front window frame portion 34, and/or the rear window frame portion 32. The substantially unidirectional fiber strip can also be positioned within the inner shell main body portion 14, extending along the rear of the main body portion and/or extending along the front of the main body portion, e.g., from the window frame portion toward the bottom portion 20. Substantially unidirectional fiber strip UD continuing in a relative straight line from window frame towards the lower part of the door shell can optionally be used to achieve maximum stiffness in the window frame.

To attain the desired crash characteristic, and to meet the Euro NCAP side impact standards, further substantially unidirectional fiber strip(s) can extend across the main body portion 14, between the front 16 and the rear 18 in a manner such that load can be transferred to the BIW during a side impact. Additional UD strips placed more in the center of the main body can have the advantage of preventing cracking of the inner shell during a crash, e.g. when the door bends. The substantially unidirectional fiber strip(s) can also be arranged such that the thermal expansion of the side door is controlled in such a way that under hot (e.g. ≥60° C.) or cold (e.g. ≤−30° C.) conditions, the shape of the door still fits well with the rest of the car. In other words, so that the interface between the door and the body remain within desired tolerances during thermal cycling. Hence, tolerances with respect to the gap between the door and the body desirably change due to thermal changes, by less than or equal to 1 mm. Similarly, the surface of the door remains substantially flush with the remainder of the adjacent area of the car. In addition, the inner shell support beam 24 is formed from the substantially unidirectional fiber strip UD as shown.

Figure 3:
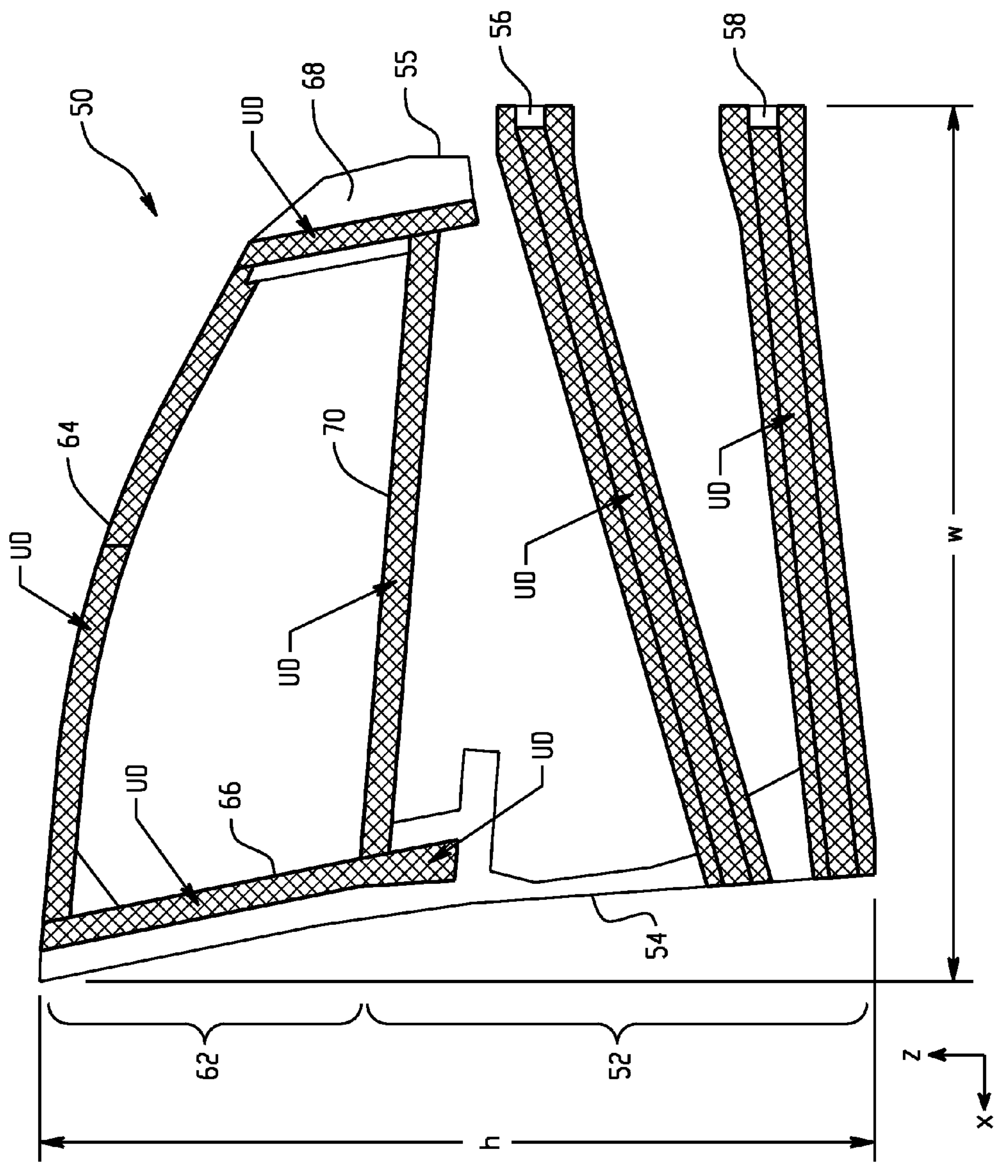
FIG. 3 is an illustration of the outer shell of the two-shell composite including exemplary locations for the substantially unidirectional fiber strip.
Figure 4:
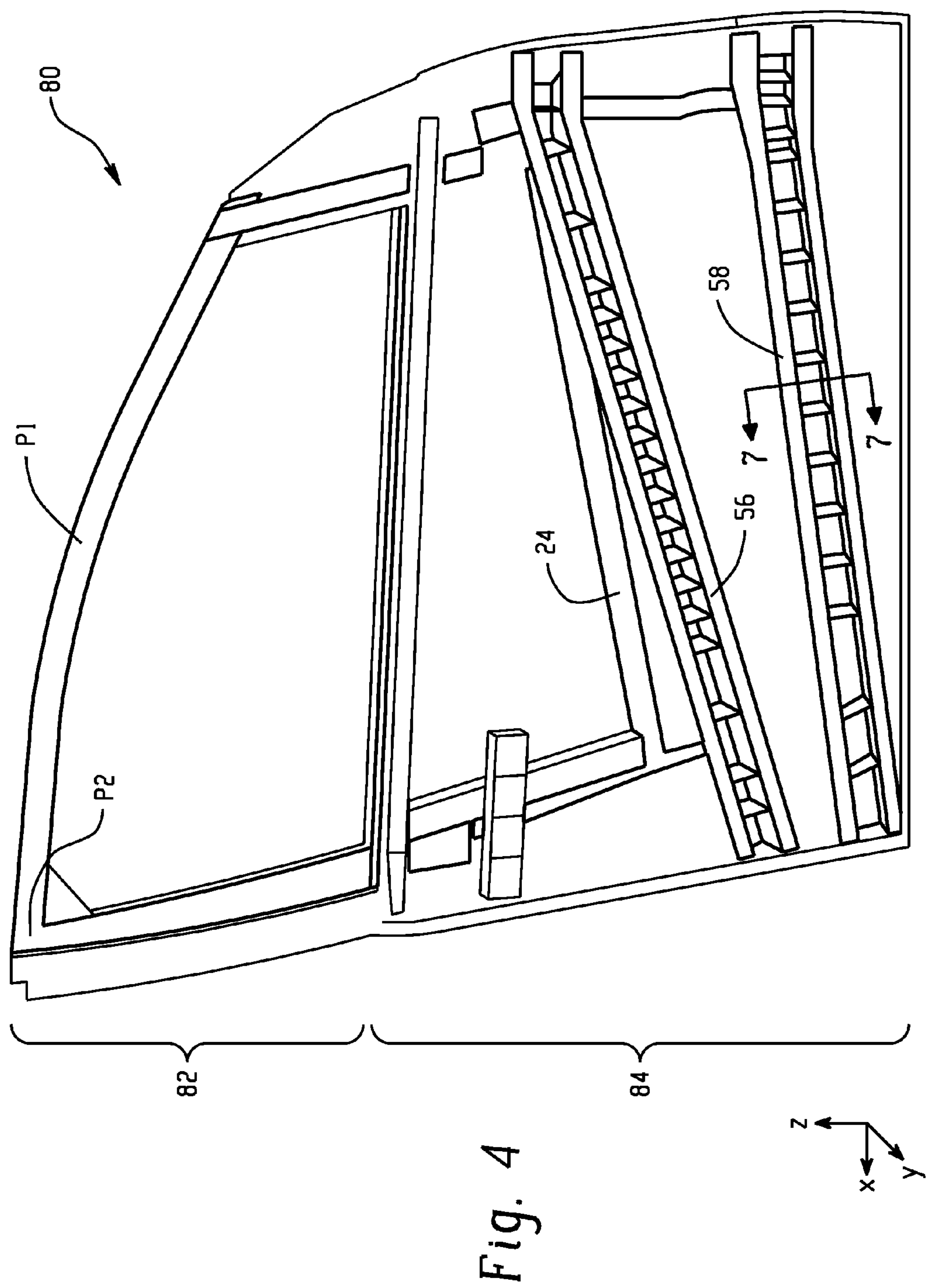
FIG. 4 is an illustration of the two-shell composite according to an exemplary embodiment.
Figure 7:
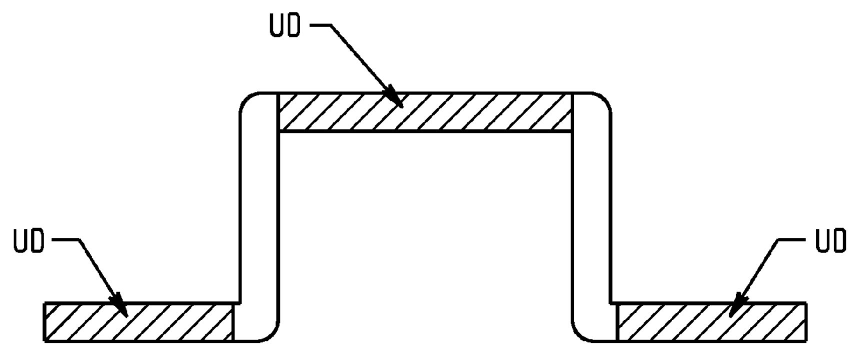
FIG. 7, which is a cross-section taken along lines 7-7 of FIG. 4, is an illustration of exemplary locations for the substantially unidirectional fiber strip in an inner shell or outer shell support beam.
Figure 8:
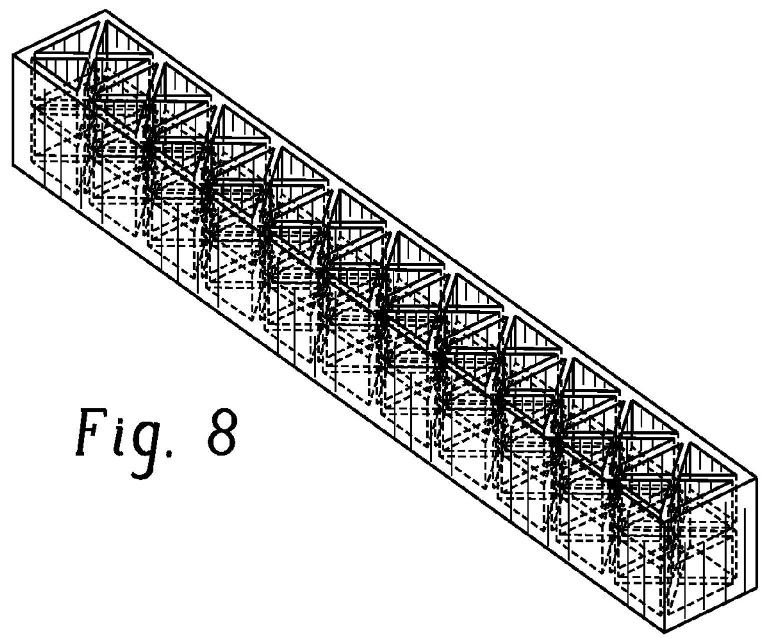
FIGS. 8-11 are perspective views of various exemplary embodiments of support beams that can be employed in the inner shell or the outer shell of the two-shell composite.
Figure 9:
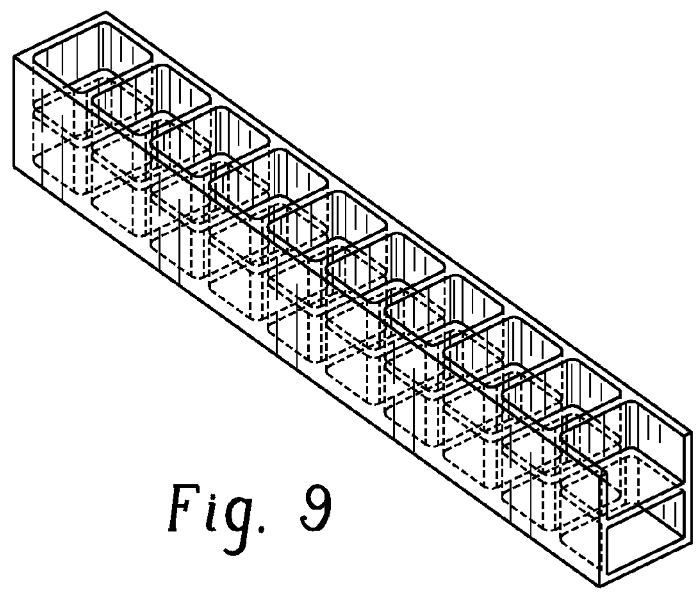
Figure 10:
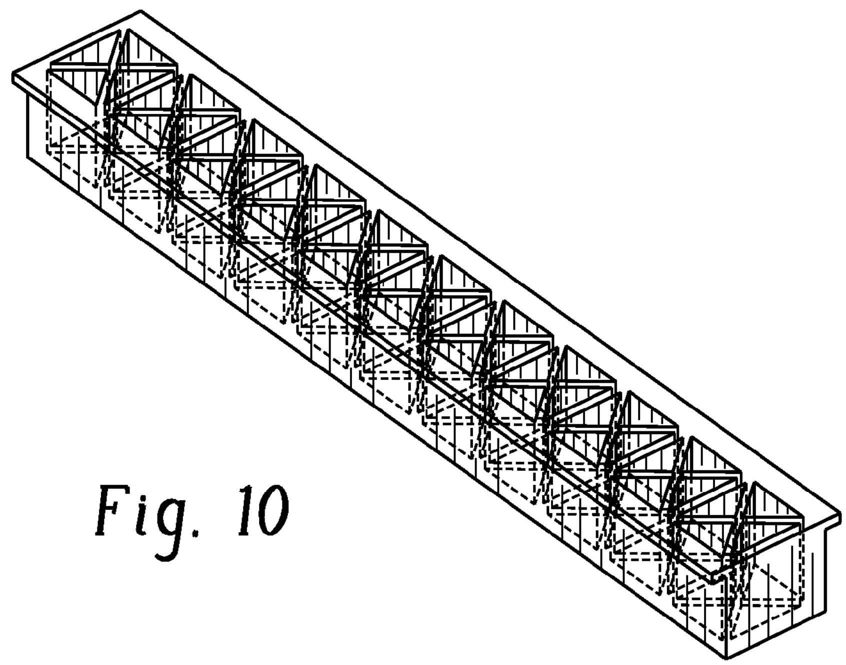
Figure 11:
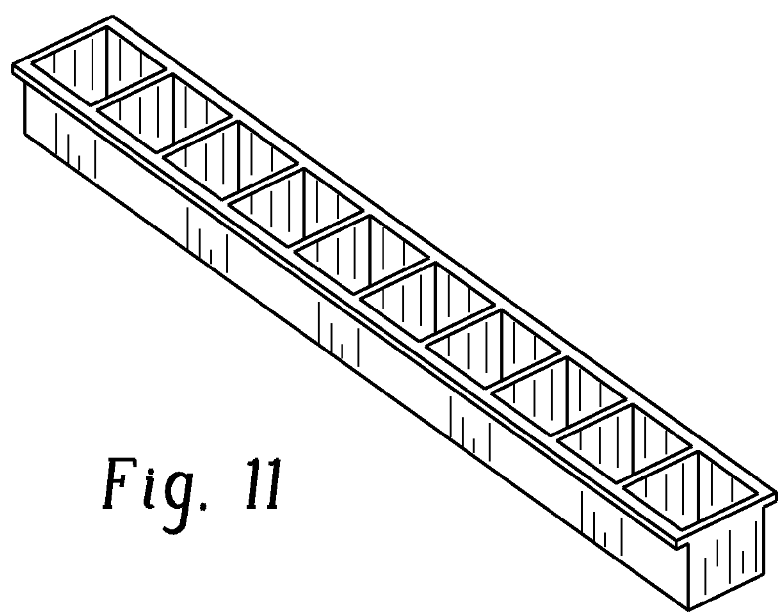

Turning now to FIG. 3, an embodiment of the plastic outer shell 50 of the two-shell composite structure is illustrated, the outer shell having a width w and a height h as shown. The outer shell 50 includes an outer shell main body portion 52 having a rear main body portion 54 and a front main body portion 55. The outer shell also includes an outer shell window frame portion 62. The outer shell window frame portion 62 and the outer shell main body portion 52 can each comprise a fiber-reinforced polymer material and substantially unidirectional fiber strip(s). The outer shell lower support beam(s) 58 can be solely made of substantially unidirectional fiber strip(s), however combining it with fiber-reinforced polymer material can improve the performance, e.g. by maintaining the cross-sectional shape of the beam, and preventing this shape from collapsing during impact. Adding ribs from this fiber reinforced polymer material will help to achieve this, as shown in FIG. 4 on beams 56 and 58. Further, this polymer material will help in introducing the loads into the UD-strip parts, as resulting from the crash impact, and transferring these loads to the rest of the door structure. As an example, see also polymer material in the webs that connect the UD-strips in the beam as shown in FIG. 7.

FIG. 3 shows the position of the substantially unidirectional fiber strip UD in the plastic outer shell 50. As shown in FIG. 3, the substantially unidirectional fiber strip UD can be positioned in the outer window frame portion along the bottom window frame portion 70, the upper window frame portion 64, the front window frame portion 68, and/or the rear window frame portion 66. In other words, the substantially unidirectional fiber strip UD can optionally extend around the entire window frame portion 62. The substantially unidirectional fiber strip UD located in the rear window frame portion 62 can extend along the height h of the outer shell into the upper region of the rear outer shell main body portion 54. Similarly, the substantially unidirectional fiber strip UD located in the front window frame portion 62 can extend along the height h of the outer shell into the upper region of the front outer shell main body portion 55.

Depending on the available space between the outer skin and the interior limit provided by the window glass in a lowered position, it can be advantageous to include one or more beam(s) in the outer shell. The beam(s) desirably extend across the width of the shell towards areas in the body in white which are best equipped to handle the reaction forces occurring during a crash (e.g., areas of greater structural integrity that can receive the impact load without catastrophic failure). As used herein, catastrophic failure refers to a decrease in stiffness of greater than 10%. Catastrophic failure can result in a decrease in stiffness of greater than 20%, specifically, greater than 50%, and even a decrease in stiffness of 100%. For example, outer shell support beams 56 and 58 can be present. Outer shell support beams 56 and 58 can also, or alternatively, include the substantially unidirectional fiber strip UD positioned along the length of the outer shell support beams 56 and 58.

The various portions of the plastic outer shell can be formed using an overmolding process (e.g., single overmolding process). Thus, the outer shell shown in FIG. 3 is a complete plastic structure where the upper and lower support beams 56, 58 are directly molded as part of the inner shell structure.

Methods are provided for preparing the two-shell composite structure using flow molding process(es). In particular, flow molding processes are used to form the plastic inner shell and the plastic outer shell of the two-door composite. For example, the method for preparing the two-shell composite structure can comprise flow molding a fiber-reinforced polymer over a substantially unidirectional fiber strip in a mold to form a plastic inner shell, flow molding a fiber-reinforced polymer over a substantially unidirectional fiber strip in a mold to form a plastic outer shell, and joining the plastic inner shell and the plastic outer shell together to form the two-shell composite structure.

The use of overmolding processes to prepare the inner and outer shells of the composite structure, allows for the incorporation of visually appealing elements into the window frame. For example, optional ingredients such as colors, fillers, or a combination comprising at least one of the foregoing, can be directly incorporated into the fiber-reinforced polymer mixture. Such ingredients can provide visually appealing elements when combined with optional structuring of the part surface, such as e.g. giving the part a leather look. As a result, additional processes such as painting or corrosion treatment of the window frame, are no longer necessary.

The substantially unidirectional strip material is cut into segments having the desired size and shape and the segments are placed in strategic positions within the mold. The substantially unidirectional fiber strip doesn't need to be pre-shaped prior to placing segments of the strip material in the mold. Following placement in the mold, the substantially unidirectional fiber strip is overmolded with the fiber-reinforced polymer material e.g., via a flow molding process. Flow molding processes that can be used comprise injection molding, compression molding, or a combination of injection and compression molding.

The mold for the plastic inner shell 12 can include a region for the direct formation of an inner shell support beam 24 across the main body portion 14 of the inner shell. Optionally, the inner shell support beam 24 can be omitted, and in combination with other structural elements present in the two-shell composite structure, such as the support beams in the outer shell, the side door still can withstand the crash and stiffness loads. The mold can further include regions for the formation of the ribbing 26 along at least three main sides of the inner shell. Exemplary positions for the ribbing 26 within the inner shell main body portion 14 are shown in FIG. 1. Thus, the entire plastic inner shell 12 can optionally be formed using a single overmolding process. The plastic inner shell 12 can be a complete plastic structure where the support beam 24 and ribbing 26 are directly molded as part of the inner shell structure.

Similarly, the mold for the plastic outer shell 50 includes regions for the direct formation of both the outer shell upper support beam 56 and the outer shell lower support beam 58 across the width of the outer shell. Thus, the outer shell shown in FIG. 3 can be a complete plastic structure where the upper and lower support beams 56, 58 can be directly molded as part of the inner shell structure. The entire plastic outer shell 12 can optionally be formed using a single overmolding process. The plastic outer shell 50 can be a complete plastic structure where the support beams 56 and 24 are directly molded as part of the plastic outer shell structure.

The above methods are in contrast to the prior art in which beams comprising steel are manufactured separately and then welded or attached to a steel door structure.

The inner and outer shell support beams include the substantially unidirectional fiber strip placed along the length of the support beam structure. FIG. 7 is an illustration of exemplary locations for the placement of the substantially unidirectional fiber strip in an inner shell or outer shell support beam. The substantially unidirectional fiber strip is placed in the mold such that the continuous fiber reinforcement runs in a longitudinal direction, i.e., along the length of the beam, along the major axis.

FIG. 4 is a depiction of an embodiment of an assembled two-shell composite structure 80. Attachment of the plastic inner shell to the plastic outer shell to form the final composite structure can be achieved using various mechanisms including bonding agents, welds, hot-staking, fixing measures (e.g. screws, bolts), as well as combinations comprising at least one of the foregoing. Alternatively, more advanced/more expansive methods, such as an additional overmolding process resulting in both parts being joined together, are also envisioned.

The two-shell composite structure 80 has a two shell composite window frame portion 82 and a two shell composite main body portion 84. The relative positions of the inner shell support beam 24, the outer shell upper support beam 56, and the upper shell lower support beam 58 are shown in FIG. 4. As is illustrated in FIG. 4, the number of ribs in the support beams 56 and/or 58, can increase toward the middle of the support beam, thereby providing greater support in the middle versus the ends of the beam(s).

The side door can further comprise additional functional elements. Examples of functional elements include a window, window guide rails, crash tubes (e.g., a beam or tube located across the base (bottom) of the window area and configured to transfer loads during a frontal crash (e.g., when the front of the vehicle is impacted as opposed to a side impact)), a door handle, a door lock, a hinge, a door latch, a speaker, a window regulator, a hood (e.g., to divert air flow, rain, etc.), an antenna, gears, electrical equipment (e.g., computer chip(s), connectors, wiring, etc.), door mirror, door mirror adjustment knobs, softening pads (e.g., to reduce impact on the occupant body, etc.) either from soft material or injection molded from polymer, vents, inner skin (e.g., fabric, textured area, or the like, on surface of the occupant side of the door) or a combination comprising at least one of the foregoing.

Although metal support structures can add further structural integrity and can be used in conjunction with the fiber strips described herein, such structures also add weight, significant weight. Due to the level of structural integrity attained in the present design, however, the side door structure can optionally not contain metal beams or metal deformation elements, and can still meet the desired side impact tests. In other words, the composite structure can be free of metal structural support elements such as metal beams and metal deformation elements. Optionally, besides hinge(s), door handle(s), lock (or portion of the lock configured to receive the key), electrical equipment (including wiring, window mechanism), gears, an antenna, guide rail parts, and/or speakers, the door structure can be free of metal. Optionally, besides hinge(s), door handle(s), and electrical equipment, the door structure can be basically free of metal. Optionally, the accessories (e.g., door handle, lock (or portion of the lock configured to receive the key)), wiring, window mechanism, guide rail parts, and/or speakers can comprise metal.

The assembly of two separate plastic shells into a composite structure also allows for the placement of a window between the inner shell and the outer shell of the two-shell composite. In addition, since the window frame is formed as a two shell construction, window glass guide rails can be directly incorporated into the structure during the molding process. Due to the design and the placement of the substantially unidirectional fiber strip, the two-shell composite structure is able to impart the degree of structural integrity and durability to the side door that is needed to effectively cope with applied crash loads, despite the presence of a window between the inner and outer shell.

Figure 5:
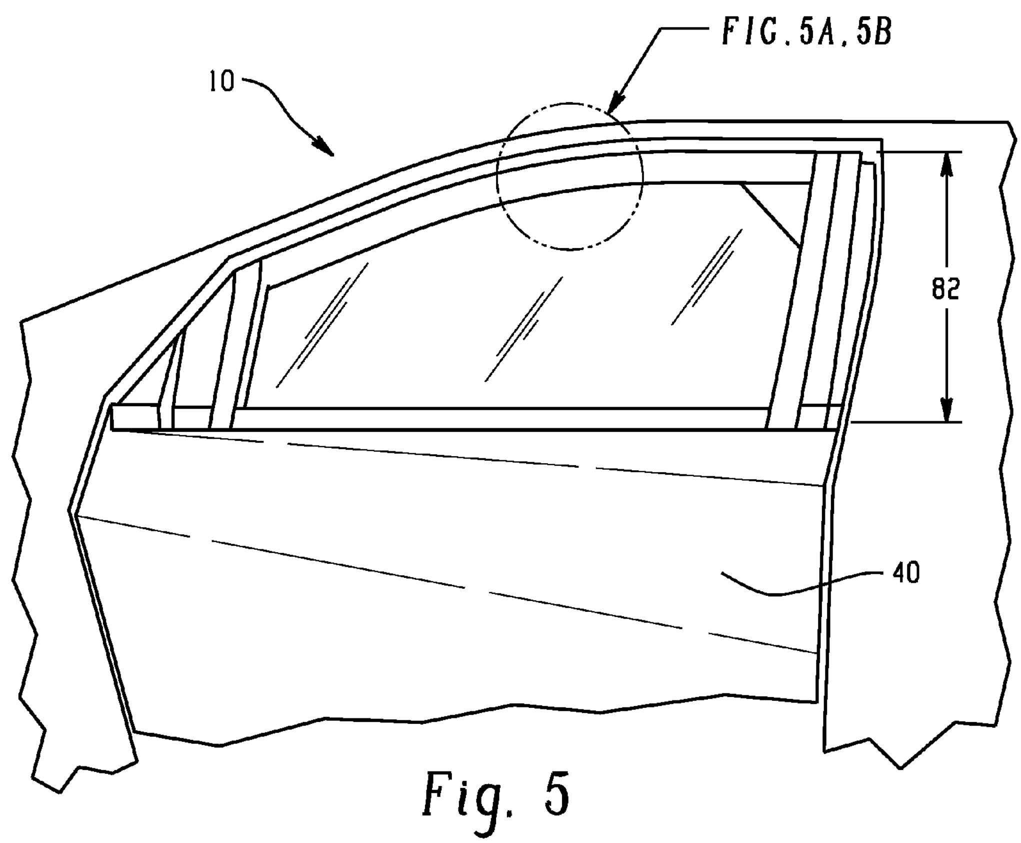
FIG. 5 is a partial side view of a vehicle, focusing on a portion of a side door.
Figure 5C:
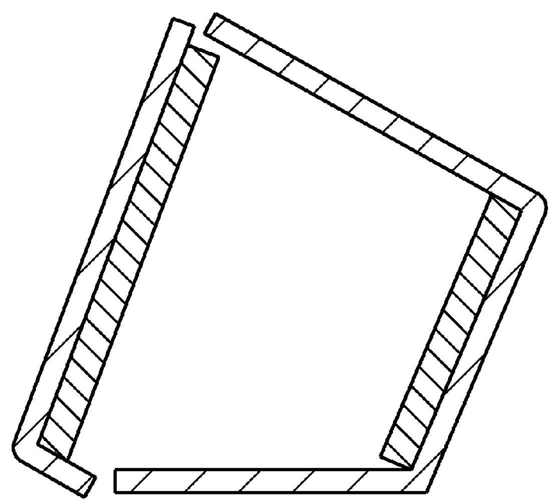
FIGS. 5A, 5B, and 5C are schematic views of examples of cross-sections of the two shell composite window frame.
Figure 5A:
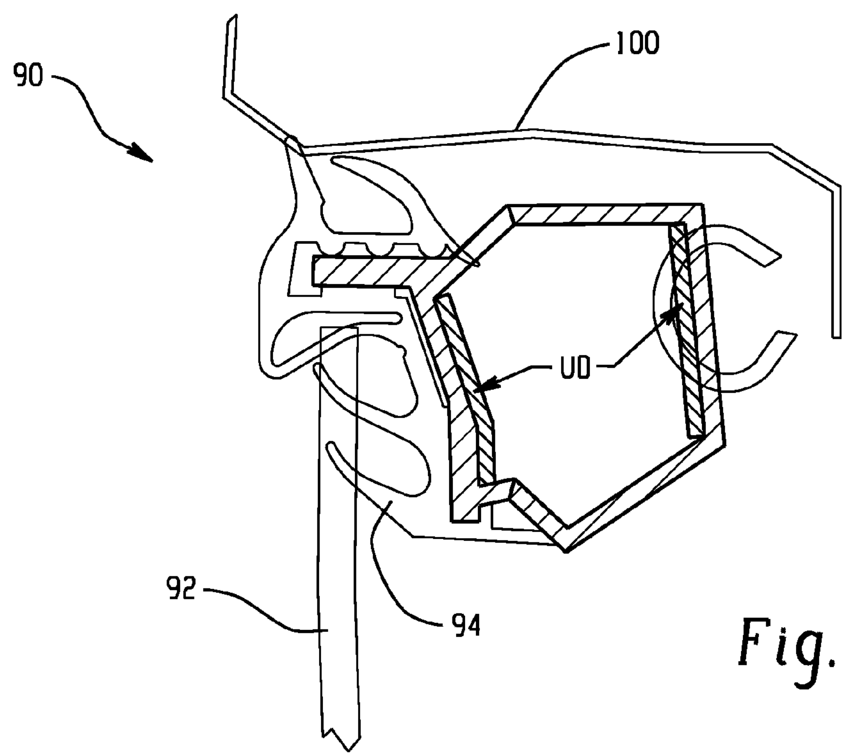
Figure 5B:
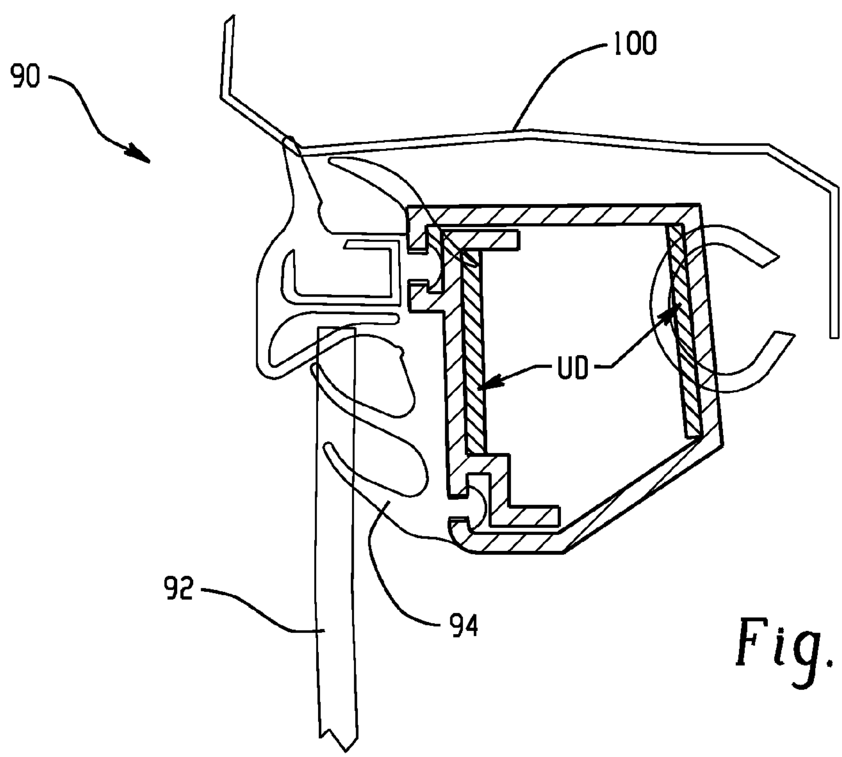

Turning to FIG. 5, an illustration is provided which shows a portion of an assembled side door with the door skin 40 and the two-shell composite window frame portion 82 indicated. FIGS. 5A and 5B are schematic views of a window seal cross-section 90 of the two shell composite window frame 82.

The window seal cross-section 90 shown in FIGS. 5A and 5B shows the relative position of a window 92, the body-in-white 100, window seal 94, and substantially unidirectional fiber strip material UD. FIG. 5C shows an expanded view of the positioning of the substantially unidirectional fiber strip material UD within the window seal cross-section. As with the substantially unidirectional fiber strip(s) in the support beams, those in the window frame the length of the frame elements, e.g., extend along the upper window frame (as opposed to across the upper window frame), extend along the lower window frame, extend along the front window frame, and/or extend along the rear window frame.

FIG. 6 provides an illustration showing a prior art side door 114, portions of the body-in-white 100, a door lock 112 and a prior art metal hinge 110 (e.g., steel hinge) At least two hinges can be used, but in principal any number of hinges can be applied. The prior art metal hinge 110 shown in FIG. 6 is configured to withstand the impact load of Euro NCAP Euro NCAP Side Impact Testing Protocol Version 5.2 (November 2011), and Euro NCAP Assessment Protocol—Adult Occupant Protection Version 5.4 (November 2011) for side door impact without breaking. For example, as shown in FIG. 6, there is no loss in connection between the side door 114 and the body-in-white 100 during or after impact. However, following impact, the side door 114 may be difficult, if not impossible, to open.

Figure 6A:
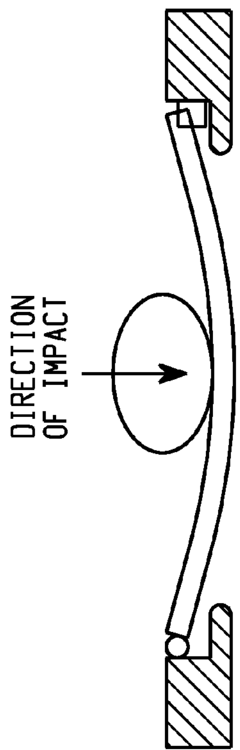
FIG. 6A is an illustration of a prior art side door and which shows the effect of applied impact on the hinges and lock.
Figure 6A:
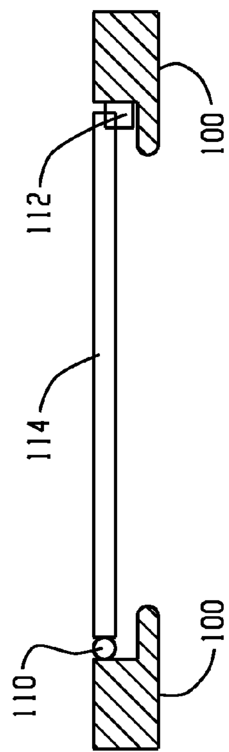
Figure 6B:
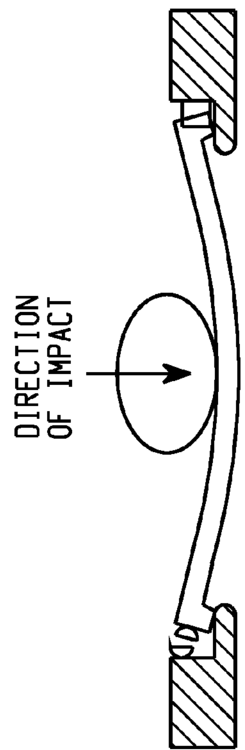
FIG. 6B is an illustration of a side door having an example of a hinge comprising a polymer and which shows the effect of applied impact on the hinges.
Figure 6B:
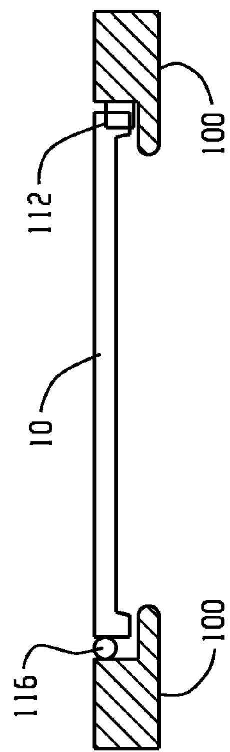

FIG. 6B provides an illustration of an exemplary plastic side door 10 comprising the substantially unidirectional strip (e.g., as illustrated in FIG. 1), portions of the body-in-white (BIW) 100, a door lock 112, and a hinge 116, wherein at least the part attached to the door structure is made of plastic or composite material, and only the hinge pin or axis (not shown), and bushing around that pin (not shown) can be of metal material. The part of the hinge 116 attached to the body may be of any construction or material. For example the hinge 116 can comprise fiber-reinforced polymer material, e.g., between the hinge and the BIW. Optionally, the hinge is formed only of fiber-reinforced polymer material. Fiber-reinforced polymer material is a relatively brittle plastic material. The area at the position of the hinge and/or at the position of the lock therefore can be engineered to break under a desired load. For example, the hinge 116 and/or lock 112 can be engineered to break during crash loads that cause significant unrecoverable deformation of the doors, e.g. door intrusions of greater than 100 mm. As used herein, "break" is intended to refer to failure of the connection of the door to the BIW, e.g., at the hinge, at the lock. The break includes a break between the hinge 116 attached to the BIW and the side door structure, inside the part of the hinge that is part of the door structure. This break during side impact enables better transfer of impact loads towards the body in white, resulting in less intrusion of the door assembly into the cabin. This also enables facile removal of a door after impact and more facile access to occupants.

For example, with the breakable connection to the BIW, following a desired impact load, the support beams in the two-shell composite structure absorb and transfer the impact energy much more efficiently to the BIW, bending without breaking, while the connection (e.g., hinge and/or lock) breaks. This combined degree of strength and flexibility is due to the positioning of the substantially unidirectional fiber strip in the inner and outer shell, the geometry of the support beams in the inner shell and the outer shell, geometry design at both of the support beam ends that effectively transfers the beam loads to the body in white, and the pattern of ribbing within the main body portion of the inner shell. Therefore, the two-shell composite design of the side door, absorbing energy in a different way, allows hinges or lock to break during a side impact test.

In some embodiments, the side door can be easily opened following the EuroNCAP side impact test conducted according to Euro NCAP Side Impact Testing Protocol Version 5.2 (November 2011). When both hinges break, the heavily deformed door can be easily pulled away, even in instances where the lock won't open anymore.

Optionally, the side door does not contain metal deformation elements.

FIGS. 7-11 are perspective views of various embodiments of support beams that can be employed in the inner shell or the outer shell of the two-shell composite. The cross-section of the support beam (or beams) is not limited to a single design or shape. The substantially unidirectional fiber strip is placed within the beam structure to obtain maximum bending rigidity within the given depth of the support beam. The support beams can also have a variable cross-section. The dimensions of the support beam (or beams) and the amount of substantially unidirectional fiber strip and fiber-reinforced polymer material used to construct the support beam can be optimized such that the support beam does not lose structural integrity during side or pole impact safety testing conducted according to Euro NCAP methods. As can be seen from these designs, the support beam can comprise ribs between two walls. The support beam can comprise ribs that are oriented diagonal (other than 90 degrees) to the two walls, and/or that are oriented perpendicular to the two walls. Optional back and/or front walls may be present, extending between and connecting the two walls, across the ribs.

Methods are also provided herein for making a side door for an automobile comprising a two shell composite structure. For example, the method can comprise flow molding a fiber-reinforced polymer over a substantially unidirectional fiber strip deposited in a mold to form a plastic inner shell, wherein the inner shell comprises an inner shell support beam positioned at an angle across a main body portion of the inner shell; flow molding a fiber-reinforced polymer over a substantially unidirectional fiber strip deposited in a mold to form a plastic outer shell, wherein the outer shell comprises at least two non-parallel, non-intersecting outer shell support beams positioned across a width of the outer shell; and joining the plastic inner shell and the plastic outer shell together to form the two shell composite structure. Automobile side doors prepared as described have a score of at least 4 in a side impact test conducted according to Euro NCAP methods.

Optionally, the method can comprise cutting the substantially unidirectional fiber strip material into segments having a desired shape and size, and placing the segments in the mold. Optionally, the substantially unidirectional fiber strip can be pre-shaped prior to placing the segments in the mold. Methods of pre-shaping can include heating and/or press-forming the substantially unidirectional strip material in a separate step to add a three-dimensional shape to the material prior to deposition in the mold. In other embodiments, the substantially unidirectional fiber strip is not pre-shaped prior to depositing the substantially unidirectional fiber strip in the mold.

In various embodiments, method further comprises the addition of functional elements in the side door. Examples of functional elements comprise a window, window guide rails, crash tubes, a door handle, a door lock, a hinge, a door latch, a speaker, a window regulator, or combinations comprising at least one of the foregoing.

In an embodiment, a side door for a vehicle can comprise: a structure comprising a plastic inner shell comprising a substantially unidirectional fiber strip, and a plastic outer shell comprising an outer shell support beam positioned across a width of the outer shell. The outer shell support beam can comprise a substantially unidirectional fiber strip. The side door can have a score of at least 4 points in a side impact test conducted according to European New Car Assessment Protocol (Euro NCAP) methods.

In another embodiment, a side door for a vehicle can comprise a structure comprising: a plastic inner shell comprising an inner shell fiber strip having greater than or equal to 50 wt. % fibers, based upon the total weight of the fibers in the strip, oriented in a direction with an angle of +45° to −45° to a main axis of the inner shell fiber strip; and a plastic outer shell comprising an outer shell support beam positioned across a width of the outer shell, wherein the outer shell support beam comprise an outer shell fiber strip having greater than or equal to 50 wt. % fibers based upon the total weight of the fibers in the strip, oriented in a direction with an angle of +45° to −45° to a main axis of the outer shell fiber strip. The side door has a score of at least 4 points in a side impact test conducted according to European New Car Assessment Protocol (Euro NCAP) methods.

In an embodiment, a vehicle can comprise: a structural body and a side door. The side door can comprise: a plastic inner shell comprising a substantially unidirectional fiber strip; a plastic outer shell comprising an outer shell support beam positioned across a width of the outer shell, wherein the outer shell support beam comprises a substantially unidirectional fiber strip; a door skin over the plastic outer shell; a window; and a hinge. The side door can have a score of at least 4 points in a side impact test conducted according to Euro NCAP methods and wherein the hinge breaks during the side impact test.

In an embodiment, a vehicle can comprise: a structural body and a side door. The side door can comprise: a plastic inner shell comprising a fiber strip having greater than or equal to 50 wt. % fibers, based upon the total weight of the fibers in the strip, oriented in a direction with an angle of +45° to −45° to a main axis of the inner shell fiber strip; a plastic outer shell comprising an outer shell support beam positioned across a width of the outer shell, wherein the outer shell support beam comprises a fiber strip having greater than or equal to 50 wt. % fibers, based upon the total weight of the fibers in the strip, oriented in a direction with an angle of +45° to −45° to a main axis of the inner shell fiber strip; a door skin over the plastic outer shell; a window; and a hinge.

In an embodiment, a method for making a side door for a vehicle can comprise: flow molding a fiber-reinforced polymer over a substantially unidirectional fiber strip to form a plastic inner shell; flow molding a fiber-reinforced polymer over a substantially unidirectional fiber strip deposited to form a plastic outer shell, wherein the outer shell comprises an outer shell support beam positioned across a width of the outer shell; and joining the plastic inner shell and the plastic outer shell together to form a composite structure. The side door can have a score of at least 4 in a side impact test conducted according to Euro NCAP methods.

In the various embodiments: (i) the plastic inner shell comprises an inner shell support beam positioned across a main body portion of the inner shell, wherein the inner shell support beam comprises substantially unidirectional fiber strip sections; and/or (ii) the plastic outer shell comprises at least two non-intersecting outer shell support beams positioned across a width of the outer shell; and/or (iii) a window frame portion of the inner shell comprises substantially unidirectional fiber strip positioned across one or more of an upper, a lower, a rear, and a front portion of the window frame portion; and/or (iv) a window frame portion of the outer shell comprises substantially unidirectional fiber strip positioned across one or more of an upper, a lower, a rear, and a front portion of the window frame portion; and/or (v) the outer shell support beam substantially unidirectional fiber strip is overmolded with fiber-reinforced polymer material; and/or (vi) the inner shell further comprises ribbing positioned in a main body portion; and/or (vii) the ribbing can be positioned along the rear, bottom, and front periphery of the main body portion; and/or (viii) the side door is free of metal structural support elements; and/or (ix) the side door has a score of greater than or equal to 6 points in a side impact test as measured according to Euro NCAP protocols; and/or (x) the side door further comprises a hinge integrated to the door, wherein the hinge breaks during the side impact test that results in a door intrusion of greater than 100 mm; and/or (xi) the side door has a score of at least 4 in a pole impact test as measured according to Euro NCAP methods; and/or (xii) the outer shell is attached to the door skin by bonding, mechanically fastening, welding, deforming of one of the components, or a combination comprising at least one of the foregoing methods; and/or (xiii) the side door further comprises a door skin adjacent to the outer shell; and/or (xiv) the side door comprises a hinge comprising fiber-reinforced polymer material; and/or (xv) the side door further comprises at least one of a window, window guide rails, crash tubes, a door handle, a door lock, a hinge, a door latch, a speaker, a window regulator, a hood (e.g., located over the window to divert air flow, rain, etc.), an antenna, gears, electrical equipment (e.g., computer chip(s), connectors, wiring, etc.), door mirror, door mirror adjustment knobs, softening pads, and a vent; and/or (xvi) the substantially unidirectional fiber strip of the plastic inner shell is located in an overmolded support beam; and/or (xvii) the side door further comprising another reinforced beam (e.g., wherein the reinforcement is not continuous fibers) extending across the door (e.g., intersecting or not intersecting the support beam(s)); and/or (xviii) an inner skin selected from fabric, textured plastic, and combinations comprising at least one of the foregoing; and/or (xix) wherein substantially unidirectional fiber strip is a strip having greater than or equal to 50 wt. % fibers, based upon the total weight of the fibers in the strip, oriented in a direction with an angle of +45° to −45° to a main axis of the fiber strip; and/or (xx) the side door can have a score of at least 4 points in a side impact test conducted according to Euro NCAP methods and wherein the hinge breaks during the side impact test; and/or (xxi) the side door can have a score of at least 6 points in a side impact test conducted according to Euro NCAP methods and wherein the hinge breaks during the side impact test.

In the various embodiments of the method: (i) the flow molding comprises injection molding, compression molding, or a combination of injection and compression molding; and/or (ii) the method further comprises cutting the substantially unidirectional fiber strip into segments having a desired shape and size and placing the segments in the mold; and/or (iii) the method further comprises attaching a door skin to the outer shell.

Also included herein are methods for making any of the above side doors comprising flow molding the inner shell, flow molding the outer shell, and joining the inner and the outer shell.

Further included herein are vehicles (e.g., automobiles, trucks, and so forth), comprising any of the above side doors. The vehicles can further comprise other typical vehicle parts such as the structural support, a steering mechanism, a propulsion mechanism (e.g., engine), bumpers, lights, seats, glazing, roof, additional doors, and/or trunk/hatch back, and so forth.

The side door comprising a two-shell composite is further illustrated by the following non-limiting examples.

EXAMPLES

Example 1

Figure 12:
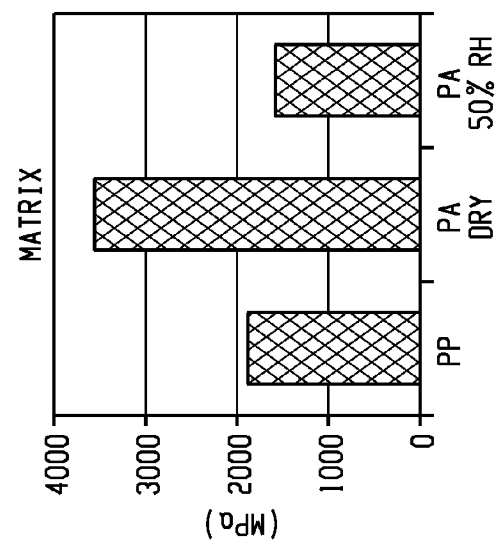
FIG. 12 is a graph showing the elastic modulus of non-reinforced polymer materials.

Testing of Substantially Unidirectional Continuous Fiber Reinforcing Material The elastic modulus of non-reinforced polymer materials was tested or derived by micromechanical analysis using standard methods. Tensile modulus was tested according to ISO 527, as valid in 2012, at room temperature, and under standard lab conditions. Micromechanical analysis software used was simple_mmech_v25, available from university of Leuven at 2012. FIG. 12 is a graph showing the elastic modulus (E-modulus) of non-reinforced polymer matrix materials (polypropylene (PP), polyamide (PA) (dry) and PA 50% relative humidity (RH)). As shown in FIG. 12, there is a high degree of variation in elastic modulus between the different polymers tested. That is, the elastic modulus is dependent upon the type of polymer being tested, and even the relative humidity.

Figure 14:
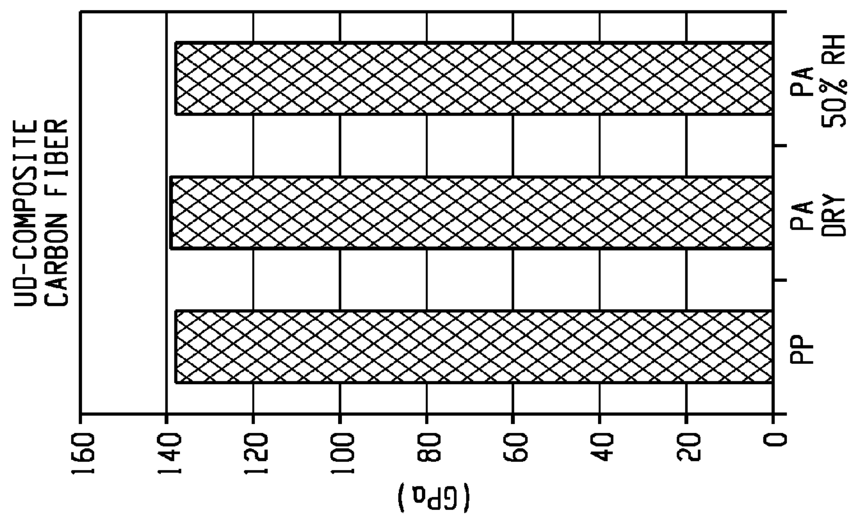
FIG. 14 is a graph showing the elastic modulus of various substantially unidirectional carbon fiber strips.
Figure 13:
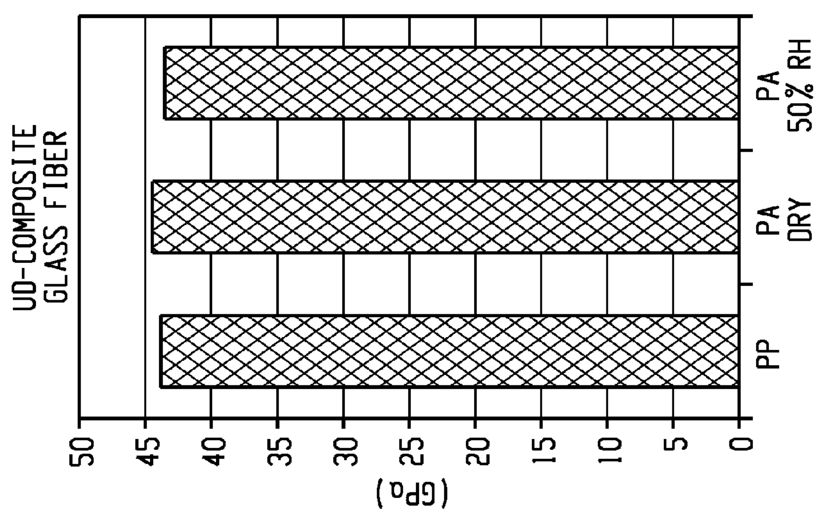
FIG. 13 is a graph showing the elastic modulus of various substantially unidirectional glass fiber strips.

Substantially unidirectional (UD) fiber reinforcing material (e.g., continuous fiber) was prepared using polypropylene, polyamide (dry), or polyamide 50% RH as the polymer matrix. Long glass fibers or long carbon fibers were incorporated into the polymer matrix. The volume percentage of the glass or carbon fibers was 60%. The elastic modulus of the UD composite material was tested using standard methods. FIG. 13 is a graph showing the elastic modulus of continuous glass-fiber reinforcing material (glass-fiber UD-composite). FIG. 14 is a graph showing the elastic modulus of continuous carbon-fiber reinforcing material (carbon-fiber UD-composite).

As shown in FIG. 13, there is a significant increase in the elastic modulus of PP, PA, and PA 50% RH glass fiber UD-composites. Similarly, as shown in FIG. 14, there is also a significant increase in the elastic modulus of PP, PA, and PA 50% RH carbon fiber UD-composites. Further, as shown in FIGS. 13 and 14, the variation in elastic modulus observed between the non-reinforced PP, PA (dry), or PA 50% RH is virtually eliminated by the presence of the UD fiber in the polymer matrix. It is also noted that, with the continuous fiber, the RH is no longer a factor in the elastic modulus.

Example 2

Preparation of a Two-Shell Composite Structure

A two-shell composite structure was prepared using STAMAX* resin commercially available from SABIC Innovative Plastics IP B.V., and a substantially unidirectional glass fiber strip material. The glass fiber strip material was prepared using continuous long glass fibers embedded in a polypropylene matrix, and provided as tape on rolls. Layers of the tape were stacked such that the fibers in each of the layers were parallel to the length of the material.

Segments of the PP-glass fiber strip were cut and placed at predetermined positions within the inner shell mold and the outer shell mold. The STAMAX* material was injected into the mold. It has been found that good adhesion between a UD-glass PP insert and STAMAX overmolding material takes place when preheating the insert material to such a temperature that during the actual overmolding process, the insert material at the interphase is still molten, or melts again by the heat of the overmolded STAMAX* material. Process parameters for the overmolding of the STAMAX* material are those as recommended in the processing datasheet for STAMAX* that can be obtained from SABIC.

Example 3

Window Frame Static Load Testing

The window frame of a side door including the two-shell composite structure of Example 2 was subjected to testing using static loadcase methods to evaluate the stiffness of the composite window frame. For comparison, a steel door was also tested.

The window frames were subjected to a load (force) of 400 N at a midpoint P1 and a corner point P2 (FIG. 4) of the two-shell composite window frame portion, and at corresponding points on the steel-based window frames. The degree of deformation in the force direction was then measured at both the midpoint Pland the corner point P2.

Table 1 compares the deformation observed following the application of a load force of 400 N. As shown in Table 1, the window frame of the two shell composite side door performs better under static loading than the window frame of steel-based doors.

TABLE 1

| | Deformation (mm) in force (400 N) direction | |
|---|---|---|
| | Midpoint (P1) | Corner Point (P2) |
| Steel door | 19.6 | 22.7 |
| Two-shell composite door | 11.0 | 9.2 |

The weight of the composite window frame of the side door was optimized by adjusting the amount of substantially unidirectional composite along various points of the inner shell and the outer shell. The amount of STAMAX at various points was also adjusted. The goal was to optimize the design of the plastic door so that deformation under a static load of 400N at both the midpoint and corner point are less than the steel doors, and retaining a feel of "stiffness" comparable to that of a steel door under all conditions.

Figure 15:
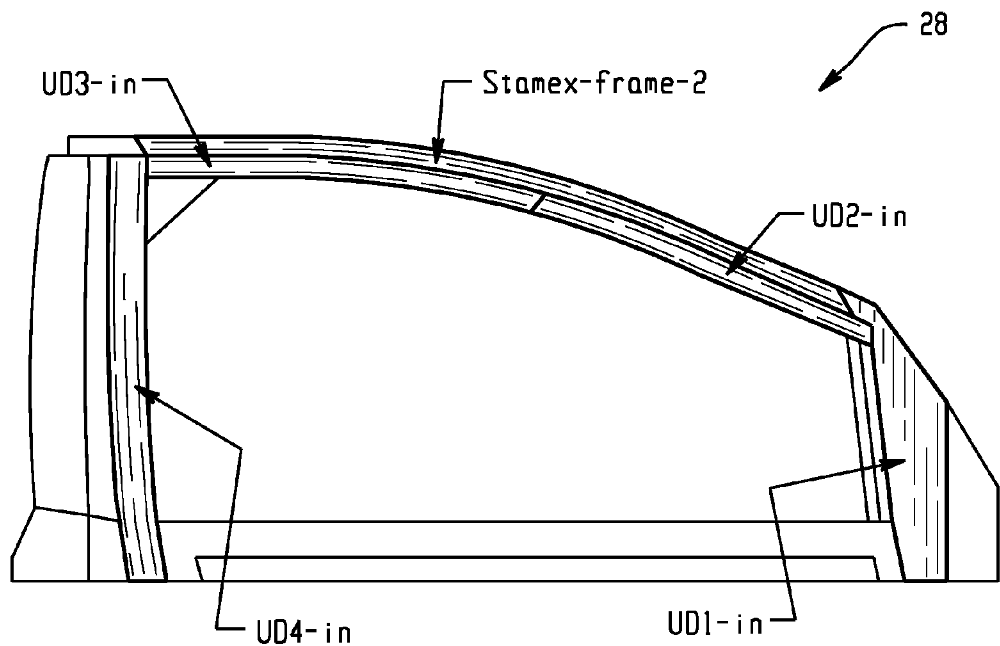
FIG. 15 is a perspective view of the inner shell window frame portion indicating areas optimized to adjust the weight of the side door.
Figure 16:
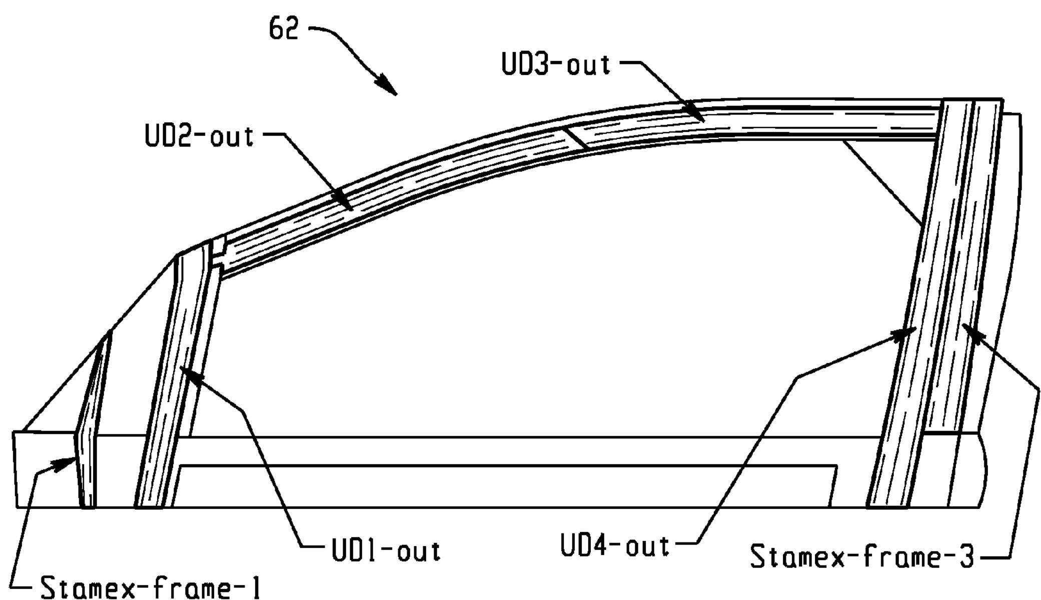
FIG. 16 is a perspective view of the outer shell window frame portion indicating areas optimized to adjust the weight of the side door.

FIG. 15 is a perspective view of the inner shell window frame portion indicating areas optimized to adjust the weight of the side door. FIG. 16 is a perspective view of the outer shell window frame portion indicating areas optimized to adjust the weight of the side door. In conjunction with FIGS. 15 and 16, Table 2 below shows the thickness of the glass fiber strip material (UD) placed at each point in Designs 1 and 2 of the composite door structure. Also summarized in Table 2 is the degree of deformation observed at P1 and P2 at room temperature following application of a static load of 400 Newtons (N) at each point.

TABLE 2

| Design Variables | Design 1 Thickness (mm) | Design 2 UD (mm) |
|---|---|---|
| UD1-in | 3 | 0.6 |
| UD2-in | 3 | 0.8 |
| UD3-in | 3 | 1.0 |
| UD4-in | 3 | 0.6 |
| UD1-out | 3 | 0.8 |
| UD2-out | 3 | 1.0 |
| UD3-out | 3 | 0.6 |
| UD4-out | 3 | 0.4 |
| Mass window frame (g) | 1429 | 766 |
| Weight reduction (g) | | 663 |
| P1; Deformation (mm) in force (400 N) direction | 11.0 | 15.3 |
| P2; Deformation (mm) in force (400 N) direction | 9.2 | 14.3 |

Table 2 shows that by modifying the thickness of the glass-fiber UD strip at various positions, the overall weight of the composite side door is significantly decreased. The weight of Design 2 window frame is 663 g lighter than the Design 1 window frame. Both of these designs are lighter than a steel door. Furthermore, the deformation in the direction of force at both the midpoint and the corner point of the optimized two-shell composite window frame is still less than the amount of deformation observed with the steel window frames (see Table 1).

It should also be noted that Design 2 was 413 g lighter than the steel window frames, which had a weight of 1,179 g. In other words, this design has a weight savings of greater than or equal to 20%, specifically, greater than or equal to 30%, while still showing lower deflection values.

Example 3

Impact Performance During Euro NCAP Side Impact Testing

A door including the optimized two-shell composite of Example 2 was subjected to side impact testing and pole impact testing methods conducted according to the Euro NCAP Side Impact Testing Protocol Version 5.2 (November 2011), and Euro NCAP Assessment Protocol—Adult Occupant Protection Version 5.4 (November 2011).

A generic full or reduced car model was used for the evaluation of side door performance according to Euro NCAP side impact testing methods. The exemplary automobile tested included a steel rear door and a composite front door. The composite front door included a two shell composite having the structure shown in FIG. 4. The side impact test performance of this model was compared with a vehicle model having both a rear steel door structure and a front steel door structure.

The side door impact test was conducted on the composite or steel front doors using a flat barrier impact at a target speed of about 50 km/h±1 km/h as per Euro NCAP testing protocols. The degree of intrusion by the side door into the car following side impact was evaluated. The results showed that the composite front door showed less intrusion into the car as compared to the steel front door, while the structure part of the composite door replacing the steel structure was 30% lighter in weight.

Figure 17:
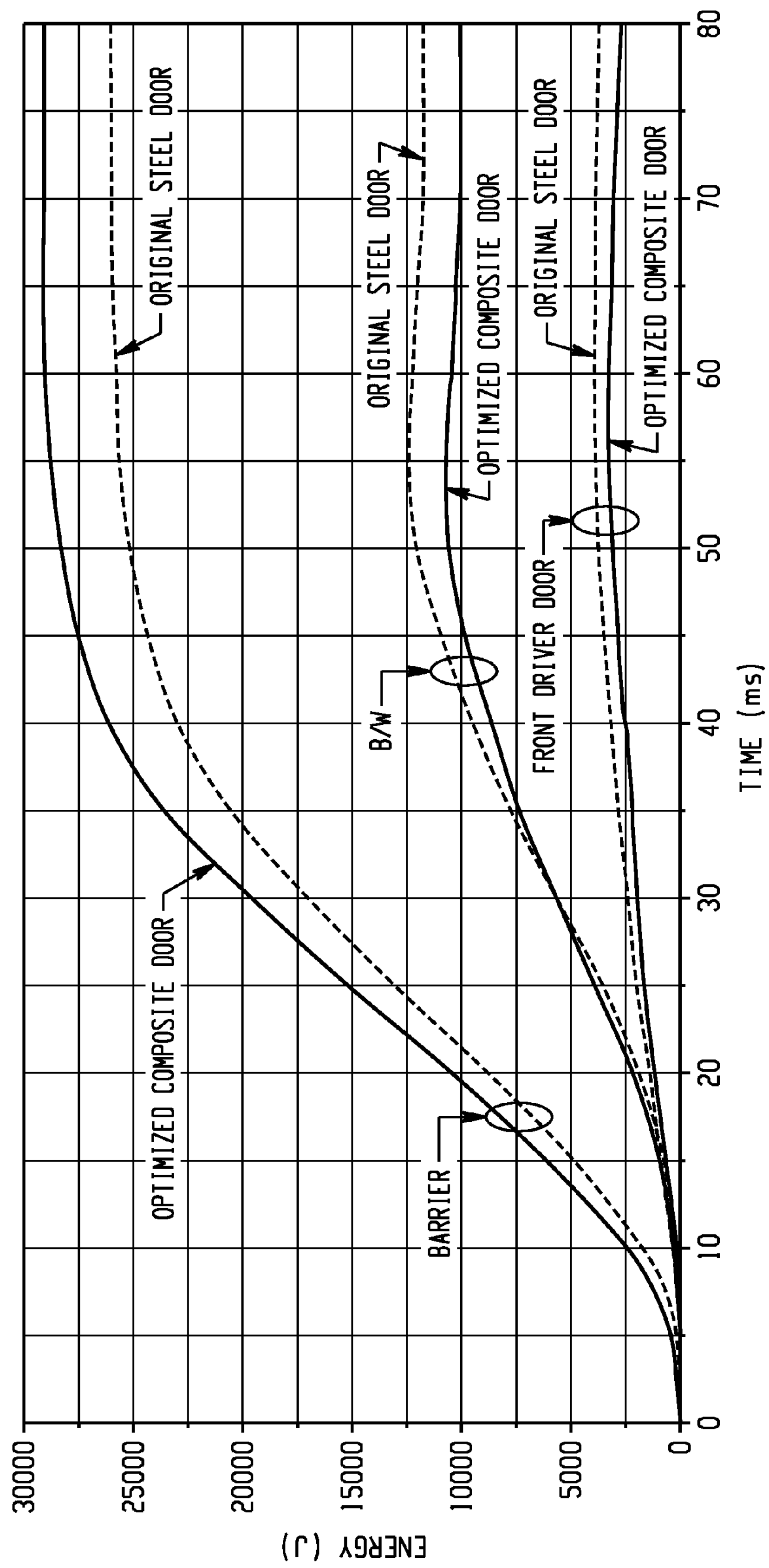
FIG. 17 is a graph showing the internal energy distribution in the side door, the body-in-white, and the barrier following a side impact test.

FIG. 17 shows the internal energy distribution in the side door, the body-in-white, and the barrier following a side impact test of an automobile including a composite door, and an automobile including a steel door. The graph shows that when compared to the model having the steel door, the composite door dissipates less energy while the barrier absorbs more. This indicates a more rigid behavior for the composite door.

Injury criteria according to EuroNCAP Assessment Protocol—Adult Occupant Protection Version 5.4 (November 2011) were also evaluated to arrive to a EuroNCAP point rating. See Table 3 comparing results for a metal and composite door. The results show that the maximum 8 point rating for the car with composite door is to be expected for this specific test.

TABLE 3

| Body part | EuroNCAP criterion | Steel door | Composite door |
|---|---|---|---|
| Chest/Rib Viscous criterion | <0.32 m/s | 0.13 | 0.10 |
| Abdomen Injury, Abdomen force | <2.5 kN | 1.8 | 1.2 |
| Pelvis Injury, Pubic Symphysis Force | <3 kN | 3.5 | 2.0 |

For side impact tests, the support beams play a key role in energy absorption and transfer of loads to the body in white.

Example 4

Impact Performance During Euro NCAP Pole Impact Test Performance

A generic full car model was used for the evaluation of side door performance in Euro NCAP pole side impact testing protocols conducted according to Euro NCAP Pole Impact Testing Protocol Version 5.2 (November 2011), and Euro NCAP Assessment Protocol—Adult Occupant Protection Version 5.4 (November 2011). A pole impact at a target speed of about 29±0.5 km/h, and a target pole impact angle of about 90°±3° as per Euro NCAP testing protocols was studied.

The exemplary automobile tested included a steel rear door and a composite front door. The composite front door included a two shell composite having the structure shown in FIG. 4. The side impact test performance of this model was compared with a vehicle model having both a rear steel door structure and a front steel door structure.

The degree of intrusion by the side door into the car following pole impact was evaluated. The composite door showed somewhat less intrusion into the passenger compartments following the pole impact test as compared to the steel door.

Figure 18:
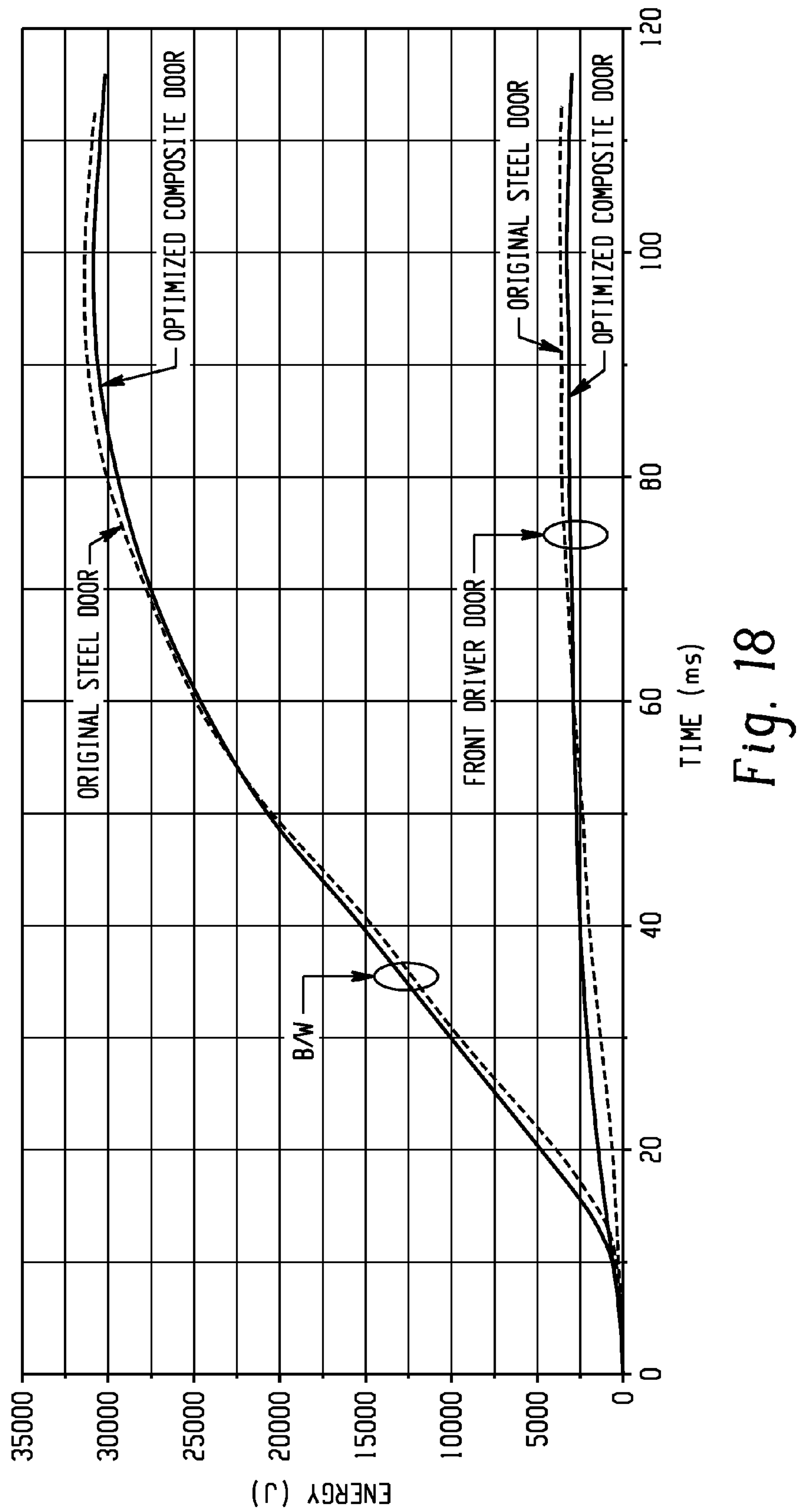
FIG. 18 shows the internal energy distribution in the side door and the body-in-white following a pole impact test.

FIG. 18 shows the internal energy distribution in the side door and the body-in-white, following a pole impact test of an automobile including a composite door, and an automobile including a steel door. The graph shows that the energy dissipation in the model having the composite door is nearly the same as the energy dissipation observed for the model having the steel door.

Injury criteria according to EuroNCAP Assessment Protocol—Adult Occupant Protection Version 5.4 (November 2011) were evaluated to arrive to a EuroNCAP point rating. As shown above in Table 3, the results show that the maximum 8 point rating for the car with composite door is to be expected for this specific test.

Example 5

Comparison of Cross Beam with Non-Intersecting Beams

The door described herein having two non-intersecting beams was compared to a design having crossing beams (in the manner set forth in EP 1581380 B1 to Ziegler et al.) and having the same door weight. The comparison was done by looking at the result after a EuroNCAP side crash, where the door was fitted on a small passenger car. It was found that the crossing beams layout, gave early first material failure (fracture) at the cross-section point, during the crash, already happening at 10 milliseconds (ms) after impact, while losing structural integrity at 20 ms at this point. Final damage was quite significant at the cross point of the beams at 50 ms. In other words, for a two shell design comprising crossed substantially unidirectional beams after 50 ms of impact under a EuroNCAP side crash load, the beam failed at the juncture.

Structural damage as seen with the cross layout, in this safety critical part is to be avoided, as it firstly will result in poor safety behavior, and also when fracture occurs the safety behavior will be largely depending on small variations on production conditions, or impact conditions.

The design illustrated in FIG. 4, two non-intersecting structural beams, exhibited no damage under the same conditions. In other words, two non-intersecting beams after 50 ms of impact under a EuroNCAP side crash load exhibited no failure.

As can be seen from the above examples, a side door structure comprising greater than or equal to two support beams that extend cross the main body portion from the front toward the rear, and which comprise substantially unidirectional fiber strip(s) can attain a desired structural integrity and meet Euro NCAP side door impact safety standards. The support beams can be free of metal.

As can be seen from the above examples, a side door structure comprising a support beam comprising a substantially unidirectional fiber strip, and no intersecting support beams (e.g., wherein all support beams in the door structure are non-intersecting) can attain a desired structural integrity and meet Euro NCAP side door impact safety standards. The support beams can be free of metal.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A side door for a vehicle, comprising:

a structure comprising a plastic shell comprising a shell support beam positioned across a main body portion of the shell;

wherein the shell support beam comprises substantially unidirectional fiber strip sections, wherein the plastic shell comprise a plastic inner shell and a plastic outer shell;

wherein the structure is free of metal support elements; and wherein the side door has a score of at least 4 points in a side impact test conducted according to European New Car Assessment Protocol (Euro NCAP) Side Impact Testing Protocol Version 5.2 (November 2011).

2. The side door of claim 1, wherein the unidirectional fiber strip sections comprises greater than or equal to 50 wt. % fibers, based upon the total weight of the fibers in the fiber strip sections, oriented in a direction with an angle of +45° to −45° to a main axis of the fiber strip section.

3. The side door of claim 1, wherein the plastic shell comprises at least two non-intersecting shell support beams positioned across a width of the plastic shell.

4. The side door of claim 1, wherein a window frame portion of the plastic shell comprises substantially unidirectional fiber strips positioned across one or more of an upper, a lower, a rear, and a front portion of the window frame portion.

5. The side door of claim 1, wherein a window frame portion of the plastic shell comprises substantially unidirectional fiber strip positioned across one or more of an upper, a lower, a rear, and a front portion of the window frame portion.

6. The side door of claim 1, wherein the shell support beam is overmolded with fiber-reinforced polymer material.

7. The side door of claim 1, wherein the plastic shell further comprises ribbing positioned in a main body portion.

8. The side door of claim 7, wherein the ribbing is positioned along the rear, bottom, and front periphery of the main body portion.

9. The side door of claim 1, wherein the side door is free of metal structural support elements.

10. The side door of claim 1, wherein the side door has a score of greater than or equal to 6 points in a side impact test as measured according to Euro NCAP Side Impact Testing Protocol Version 5.2 (November 2011).

11. The side door of claim 1, further comprising a hinge integrated to the side door, wherein the hinge breaks during the side impact test that results in a door intrusion of greater than 100 mm.

12. The side door of claim 1, wherein the side door has a score of at least 4 in a pole impact test as measured according to Euro NCAP Pole Impact Testing Protocol Version 5.2 (November 2011).

13. A vehicle, comprising:

a structural body; and a side door comprising a plastic shell comprising a shell support beam positioned across a main body portion of the shell, wherein the shell support beam comprises substantially unidirectional fiber strip sections;

a door skin over the plastic shell;

a window; and a hinge;

wherein the side door has a score of at least 4 points in a side impact test conducted according to Euro NCAP Side Impact Testing Protocol Version 5.2 (November 2011).

14. The vehicle of claim 13, wherein the hinge breaks during the side impact test.

15. The vehicle of claim 13, wherein the plastic shell comprises at least two non-intersecting shell support beams positioned across a width of the plastic shell.

16. The vehicle of claim 13, wherein the side door is free of metal structural support elements.

* * * * *